United States Patent [19]

Rasansky et al.

[11] Patent Number: 5,960,406
[45] Date of Patent: Sep. 28, 1999

[54] SCHEDULING SYSTEM FOR USE BETWEEN USERS ON THE WEB

[75] Inventors: Richard A. Rasansky, Philadelphia; Leet E. Denton, III, Bala Cynwyd; Robert M. Morris, Westtown, all of Pa.

[73] Assignee: eCal, Corp., Philadelphia, Pa.

[21] Appl. No.: 09/010,963

[22] Filed: Jan. 22, 1998

[51] Int. Cl.$^6$ ............................................. G06F 17/60
[52] U.S. Cl. ............... 705/9; 705/8; 705/1; 707/500; 707/513
[58] Field of Search ............ 705/9, 8, 1; 707/500, 707/517

[56] References Cited

U.S. PATENT DOCUMENTS

| | | | |
|---|---|---|---|
| 5,050,077 | 9/1991 | Vincent | 705/8 |
| 5,124,912 | 6/1992 | Hotaling et al. | 705/9 |
| 5,570,109 | 10/1996 | Jenson | 345/146 |
| 5,664,063 | 9/1997 | Johnson et al. | 395/101 |
| 5,774,867 | 6/1998 | Fitzpatrick et al. | 705/8 |
| 5,778,346 | 7/1998 | Frid-Nielson et al. | 705/9 |
| 5,845,257 | 12/1998 | Fu et al. | 705/8 |
| 5,867,822 | 2/1999 | Sankar | 705/8 |
| 5,893,073 | 4/1999 | Kasso et al. | 705/8 |

OTHER PUBLICATIONS

Biggs, Maggie, "Database Links Boost InterOffice", InfoWorld, vol. 19, No. 48, Dec. 1, 1997.

Abualsamid, Ahmad, "Netscape Calendar Server 1.0 Rocks and Rolls", Network Computing, vol. 8, No. 4, Mar. 1, 1997.

Primary Examiner—Emanuel Todd Voeltz
Assistant Examiner—George D. Morgan
Attorney, Agent, or Firm—Klehr, Harrison, Harvey, Branzburg & Ellers, LLP

[57] ABSTRACT

A computer system for scheduling events between end users of the system. Each end user is granted a unique password protected personal calendar. This calendar is generated from information stored in a database at a central server, and delivered to each end user as standard HTML sent through the Internet. This custom personal calendar is then viewed by the end user in a standard Web Browser. This obviates the need for special software programs to be purchased by end users, and also allows end users of any CPU type to read their calendars. When an end user uses the system to send an Invitation or Announcement to others on the system, the sending end user has the option of sending Email in addition to posting that information in the calendars' of others. When an end user sends an Invitation or Announcement to a person who is not an Appointnet user, then the Appointnet system automatically creates a unique calendar for the recipient, and sends and Email to that person. Individuals who use the present system can post reminders to themselves, send announcements to people they know, and make appointments with people they know. When these messages are sent, the communications is nearly instantaneous because the system makes one record and allows both (or many) parties to view it.

3 Claims, 37 Drawing Sheets

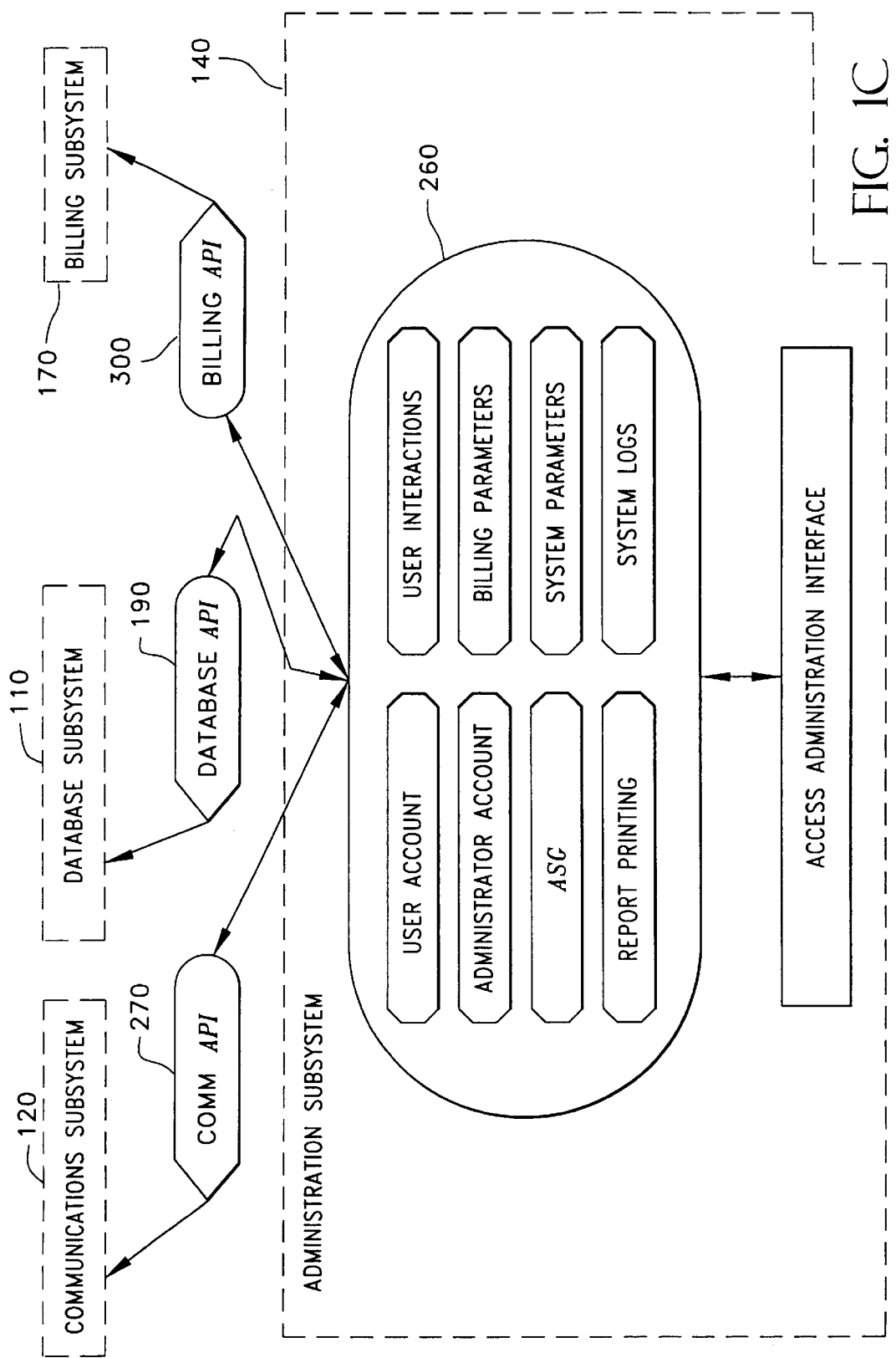

FIG. 16B

*appoint.net*

- my calendar
- invite
- announce
- remind
- preferences
- addresses
- find
- help
- news find a day
Pick the Year:
[1997 ▼]
↳1510
Pick the Month:
[Dec ▼]
↳1510
Pick the Day:
[8 ▼]
↳1510 go there today's calendar

Link to Appoint.Net

Rob Morris's Calendar   ⇐ Dec 7-13, 1997 ⇒   —1520
○ monthly  ● weekly  ○ daily   (inbox) (outbox)
12/8/97 11:35:51 AM Eastern Standard Time        (0 new items in inbox)

|  | Sun Dec 7 | MON Dec 8 | Tue Dec 9 | Wed Dec 10 | Thu Dec 11 | Fri Dec 12 | SAT Dec 13 |
|---|---|---|---|---|---|---|---|
| All Day |  |  |  | Jessee |  |  |  |
| 08:00 am |  |  |  |  |  |  |  |
| 09:00 am |  |  |  |  |  |  |  |
| 10:00 am |  |  | Deadline |  | Upload to Cube |  |  |
| 11:00 am |  |  |  |  |  |  |  |
| 11:30 am |  |  |  | in New York |  |  |  |
| 12:00 pm |  |  |  |  |  |  |  |
| 01:00 pm | NEW YORK GIANTS at Philadelphia Eagles |  |  |  |  |  |  |
| 02:00 pm |  |  |  |  |  |  |  |
| 03:00 pm |  |  |  |  |  |  |  |
| 04:00 pm |  |  |  |  |  |  |  |
| 05:00 pm |  |  |  |  |  |  |  |
| 06:00 pm |  |  |  |  |  | Birthday |  |
| 07:00 pm |  |  |  |  |  |  |  |
| 08:00 pm |  |  |  |  |  |  |  |
| 09:00 pm |  |  |  |  |  |  |  |
| 10:00 pm |  |  |  |  |  |  |  |
|  | Sun Dec 7 | MON Dec 8 | Tue Dec 9 | Wed Dec 10 | Thu Dec 11 | Fri Dec 12 | SAT Dec 13 |

Home Page/Questions or comments about this web page../©Copyright../Legal Information

*appoint.net*

- my calendar
- invite
- announce
- remind
- preferences
- addresses
- find
- help
- news find a day
Pick the Year:
1997 ▼

Pick the Month:
Dec ▼

Pick the Day:
8 ▼ go there today's calendar

Link to Appoint.Net

---

1540

Rob Morris's Calendar  ⇐ December 8, 1997 ⇒
○ weekly    ○ weekly    ● daily    (inbox) (outbox)
12/8/97 11:36:01 AM Eastern Standard Time         (0 new items in inbox)

| | Monday December 8 |
|---|---|
| All Day | |
| 08:00 am | |
| 09:00 am | |
| 10:00 am | |
| 11:00 am | |
| 12:00 pm | |
| 01:00 pm | |
| 02:00 pm | |
| 03:00 pm | |
| 04:00 pm | |
| 05:00 pm | |
| 06:00 pm | |
| 07:00 pm | |
| 08:00 pm | |
| 09:00 pm | |
| 10:00 pm | |
| | Monday December 8 |

Home Page/Questions or comments about this web page../©Copyright../Legal Information

FIG. 16C

|  | 29 | 29 | 30 | 31 | 1 |
|--|----|----|----|----|---|
| ▷ | ▼ | ▼ | ▼ | ▼ | New |

(STEP 2) Use the list boxes below to suggest times and dates that do not ap

```
              Year      Month      Day
            [   ▼]    [   ▼]    [   ▼]  ⌈
            [   ▼]    [   ▼]    [   ▼]  ⌈
1560——      [   ▼]    [   ▼]    [   ▼]  ⌈
            [   ▼]    [   ▼]    [   ▼]  ⌈
            [   ▼]    [   ▼]    [   ▼]  ⌈
```

(STEP 3) Fill in your invitation information and who you want to send it to.

Email address:
[         ]—1570

Select from saved addresses:
[              ▼]—1580

Subject:
[         ]—1590

Length of Time:
[      ▼]—1600

Time Zone: | Default (Automatically adjust)

(STEP 4) Press "Send" to submit the invitation. "Send and Email" to submit a 1610—[Send]  [Send and Email]

Home Page/Questions or comments about this web pa

FIG. 17B appoint.net

- my calendar
- invite
- announce
- remind
- preferences
- addresses
- find
- help
- news find a day

Pick the Year: 1997 ▼

Pick the Month: Dec ▼

Pick the Day: 8 ▼ go there today's calendar

Link to Appoint.Net

Invite is used to request an appointment with someone.

STEP 1 Choose up to 10 open times from your calendar. — 1620

Rob Morris's Calendar ⟵ Dec 7-13, 1997 ⟶  — 1520

○ monthly  ● weekly  ○ daily   (inbox)  (outbox)

12/8/97 11:36:35 AM Eastern Standard Time    (0 new items in inbox)

| | Sun Dec 7 | Mon Dec 8 | Tue Dec 9 | Tue Dec 10 | Thu Dec |
|---|---|---|---|---|---|
| All Day | | | ⌐ | ⌐ ▮ Jessee | ⌐ |
| 08:00 am | | | ⌐ | ⌐ | ⌐ |
| 09:00 am | | | ⌐ | ⌐ | ⌐ |
| 10:00 am | | | ⌐ ◁ Deadline | ⌐ | ⌐ ◁ Upload Cube |
| 11:00 am | | | ⌐ | ⌐ | ⌐ |
| 11:30 am | | | ⌐ | ⌐ | ⌐ |
| 12:00 pm | | ⌐ | ⌐ | ⌐ | ⌐ |
| 01:00 pm | NEW YORK GIANTS at Philadelphia Eagles | ⌐ | ⌐ | ⌐ ▮ in New York | ⌐ |
| 02:00 pm | | ⌐ | ⌐ | ⌐ | ⌐ |
| 03:00 pm | | ⌐ | ⌐ | ⌐ | ⌐ |
| 04:00 pm | | ⌐ | ⌐ | ⌐ | ⌐ |
| 05:00 pm | | ⌐ | ⌐ | ⌐ | ⌐ |
| 06:00 pm | | ⌐ | ⌐ | ⌐ | ⌐ |

FIG. 17C

| | | | | | |
|---|---|---|---|---|---|
| 07:00 pm | | ⌐ | ⌐ | ⌐ | ⌐ |
| 08:00 pm | | ⌐ | ⌐ | ⌐ | ⌐ |
| 09:00 pm | | ⌐ | ⌐ | ⌐ | ⌐ |
| 10:00 pm | | ⌐ | ⌐ | ⌐ | ⌐ |
| | Sun Dec 7 | Mon Dec 8 | Tue Dec 9 | Tue Dec 10 | Thu Dec |

( STEP 2 ) Use the list boxes below to suggest times and dates that do not ap Year　　Month　　Day　　Time 1630 — [list boxes]

( STEP 3 ) Fill in your invitation information and who you want to send it to.

Email address:
[_____]—1570　　1640—

Invitation text:
[_____]

Select from saved addresses:
[_____▼]

Subject:
[_____]—1590　1580

⌐ Send invitation as E

Length of Time:
[_____▼]—1600

Time Zone: | Default (Automatically adjust)

( STEP 4 ) Press "Send" to submit the invitation. "Send and Email" to submit a
1650

[Send]　[Send and Email]　[Reset]

Home Page/Questions or comments about this web page../©Copyright../Leg

FIG 17D

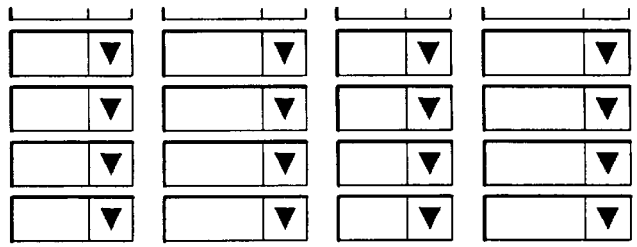

(STEP 3) Fill in your invitation information and who you want to send it to.

Email address: ──1570    1640──  Invitation text:

Select from saved addresses:

Subject: ──1590  1580

Length of Time:
──1600

☐ Send invitation as E

Time Zone: Default (Automatically adjust)

(STEP 4) Press "Send" to submit the invitation. "Send and Email" to submit a
1650──  [Send]  [Send and Email]  [Reset]

Home Page/Questions or comments about this web page../©Copyright../Leg

FIG. 17F

| | 29 | 29 | 30 | 31 | 1 |
|---|---|---|---|---|---|
| ▷ | ▼ | ▼ | ▼ | ▼ | New |

(STEP 2) Use the list boxes below to make a reminder for a time and date not on the calendar above.

Year     Month     Day

1560 —

(STEP 3) Fill in your reminder information.

Subject:

1670 —

—1590

Length of Time:

▼ —1600

Reminder text:

☐ Send reminder Email to myself

Time Zone: | Default (Automatically adjust)

(STEP 4) Press "Send" to post the reminder.

1610 —| Send |  | Send and Email |

Home Page/Questions or comments about this web pa

FIG. 18B

*appoint.net*

- my calendar
- invite
- announce
- remind
- preferences
- addresses
- find
- help
- news find a day
Pick the Year:
1997 ▼

Pick the Month:
Dec ▼

Pick the Day:
8 ▼ go there today's calendar

Link to Appoint.Net

Announce sends a message to someone.

(STEP 1) Choose up to 10 open times from your calendar.

Rob Morris's Calendar  ⇐  December 1997  ⇒
— 1470            — 1520        — 1540
○ monthly  ○ weekly  ○ daily   (inbox) (outbox)
12/8/97 11:37:16 AM Eastern Standard Time    (0 new items in inbox)

| | SUN | MON | TUE | WED | |
|---|---|---|---|---|---|
| ▷ | 30<br>01:00 pm–<br>CINCINNATI at<br>Philadelphia<br>Eagles | 1 | 2 | 3 | 4 |
| ▷ | 7<br>01:00 pm– NEW<br>YORK GIANTS at<br>Philadelphia<br>Eagles | 8 ▼ | 9 ▼<br>◁ 10:00 am–<br>Deadline | 10 ▼<br>▮ Jessee<br>▮ 11:30 am–<br>in New York | 11<br>◁ Cub |
| ▷ | 14 ▼<br>01:00 pm–<br>Philadelphia<br>Eagles at Atlanta<br>◁ 03:00 pm–<br>Party Time | 15 ▼ | 16 ▼<br>▮ 05:00 pm–<br>Clare Harrison | 17 ▼ | 18<br>◁ |
| ▷ | 21 ▼<br>01:00 pm–<br>Philadelphia | 22 ▼ | 23 ▼ | 24 ▼ | 25<br>Chri |

FIG. 19A ( STEP 2 ) Use the list boxes below to select days not on the calendar.

1560

( STEP 3 ) Fill in your announcement information and who to send it to.

Email address:
☐ —1570

Select from saved addresses:
☐ ▼ —1580

Subject:
☐ —1590

Length of Time:
☐ ▼ —1600

Time Zone: | Default (Automatically adjust)

( STEP 4 ) Press "Send" to submit your announcement.

1610 —[ Send ]    [ Send and Email ]

Home Page/Questions or comments about this web pa

*appoint.net*

- my calendar
- invite
- announce
- remind
- preferences
- addresses
- find
- help
- news find a day
Pick the Year:
1997 ▼

Pick the Month:
Dec ▼

Pick the Day:
8 ▼ go there today's calendar

Link to Appoint.Net

FIG. 20

In Box

New messages are automatically displayed below.
For other messages use the dialog box below to look up the appointments, announcements, and reminders that were sent to you. Click the New and Old radio button. Use the drop down boxes to select the kind of message, and limit the time period for the search. Then click Send.
The results are presented to you as a list separated by month.

Click on a message to see more detail about it. Scroll down for more.

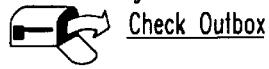 Check Outbox

○ Show Unread     | Show All ▼ |

⦿ Show Read and Unread    | All Times ▼ |

[Send] [Reset]

December 1997

- Deadline Tuesday, December 9, 1997 at 10:00:00 AM
- Jessee Wednesday, December 10, 1997 All Day
- in New York Wednesday, December 10 1997 at 11:30:00 AM
- Upload to Cube Thursday, December 11, 1997 at 10:00:00 AM
- Birthday Friday, December 12, 1997 at 6:00:00 PM
- Party Time Sunday, December 14, 1997 at 3:00:00 PM
- Clare Harrison Tuesday, December 16, 1997 at 5:00:00 PM
- Budapest Thursday, December 18, 1997 All Day
- Willie Day Friday, December 19, 1997 All Day
- France Friday, December 19, 1997 All Day
- Party night Saturday, December 20, 1997 at 9:00:00 PM

April 1998 appoint.net

- my calendar
- invite
- announce
- remind
- preferences
- addresses
- find
- help
- news find a day

Pick the Year:
1997 ▼

Pick the Month:
Dec ▼

Pick the Day:
8 ▼ go there today's calendar

Link to Appoint.Net

FIG. 21A

Rob Morris's Calendar ⇐ December 11, 1997 ⇒
○ weekly   ○ weekly   ⊙ daily   (inbox) (outbox)
12/8/97 2:06:06 PM Eastern Standard Time    (0 new items in inbox)

| | | Thursday December 11 |
|---|---|---|
| All Day | | |
| 08:00 am | | |
| 09:00 am | | |
| 10:00 am | Upload to Cube<br>1680<br>1690<br>1690<br>1700 | From: Trip Denton<tdenton@appoint.net><br>To: rmorris@appoint.net<br>Subject: [Upload to Cube] Status: Announcement<br>Text:<br>Upload to cube today and test<br>up there till dec 15th<br>―――――――――――<br>Length of Time: None<br>☐ Remove these announcements<br>―――――――――――<br>☐ Send Email response<br>Response Subject: [Upload to Cube]<br>Response Message:<br>[                    ]<br>―――――――――――<br>Contact Log: (Only you see this)<br>[                    ]<br>―――――――――――<br>[Send]  [Send and Email]  [Reset] |
| 11:00 am | | |
| 12:00 pm | | |
| 01:00 | | |

Bulk Entry

Forum

- Create Sign-Up
- Create Group Announcement

---

Developer Page=/calendar/show_cal1.asp

- Calendar
- Make System Overlay from file
- Change Status Message

FIG. 21B

| | |
|---|---|
| pm | |
| 02:00 pm | |
| 03:00 pm | |
| 04:00 pm | |
| 05:00 pm | |
| 06:00 pm | |
| 07:00 pm | |
| 08:00 pm | |
| 09:00 pm | |
| 10:00 pm | |
| | Thursday December 11 |

Home Page/Questions or comments about this web page../©Copyright../Le

FIG. 21C

SCHEDULING SYSTEM FOR USE BETWEEN USERS ON THE WEB

FIELD OF THE INVENTION

This invention is in the field of scheduling, and teaches a method for scheduling meetings, appointments, announcements, and other forms of communications by means of a computerized system. More particularly, this invention relates to a networked computer hardware and software system that allow users of the system to reserve times in one another's schedules.

BACKGROUND OF THE INVENTION

Whenever people attend trade shows, meetings and other activities that bring together groups of people, it is often desired by people at those gatherings to schedule several meetings with different individuals. Similarly, it is often desired to make reservations for appointments at such establishments as restaurants, salons, and automobile servicing centers. Additionally individuals often contact other business and social contacts to confirm scheduled meetings, or to modify plans for existing arrangements. In these cases a conflict oftentimes arises in the new schedule that must immediately be resolved, or else one of the events creating the conflict will not be attended by all members of the expected group. When this happens frequently one or both of the scheduled events will not be successful.

In the past, people scheduled appointments by telephone, fax, or perhaps by a brief informal meeting to arrange a convenient time for longer appointments. Notations about these appointments would typically be written in pencil on a paper calendar until the appointment was confirmed. Confirmed appointments would be written in ink on paper calendars. The amount of erasures and strikeouts in most busy business person's paper calendar attests to the inefficiencies of this type of appointment scheduling.

Recently, computer-based systems have been developed that essentially automate the manual procedures outlined above, and allow individuals to make entries about appointments into computer based calendars. Programs like GROUPWISE, by Novell, Inc. and other have endeavored to improve upon the appointment and scheduling process, but instead they have succeeded in creating complex proprietary systems that require custom software on each computer, specialized hardware, and often operate within limited proscribed network environments. This result falls far short of fulfilling a need in the art for technology that coordinates myriad schedules, and facilitates making appointments with people in disparate locations, time zones, and computing environments.

SUMMARY OF THE INVENTION

The aforementioned problems are met and long-felt needs solved by computer systems for scheduling events provided in accordance with the present invention. The systems preferably comprise an end user interface that is generated in a standard page markup syntax and sent using standard communication protocols, thereby allowing end users to communicate with the system. The systems further preferably comprise means for delivering the scheduling events to end users of the system using the above standards. Even more preferably, the systems comprise means for confirming the proposed events by the end users using the above standards.

In still further preferred embodiments, computer systems for scheduling events between end users provided in accordance with the invention solve the aforementioned problems and long-felt needs. Preferably, theses systems comprise a client interface that allows an initial end user to communicate a desire to schedule and event through the system to potential end users. Still more preferably, the systems comprise a transport medium interface for allowing the system to transport proposed event schedules between potential end users of the system. Yet more preferably, the systems comprise a computer subsystem for generating for the initial end user of the system, a calendar that is adapted to contain the events for that initial client and which is modifiable when other end users of the system, or that first user places messages about events into the calendar of the initial user.

Methods for scheduling events also satisfy the above referenced long-felt needs. Preferably the methods comprise the steps of allowing an initial end user to communicate events to other potential end users or to himself, delivering the events from the initial end user to the other potential end users, or to the initial end user, with a standard protocol, and confirming the events in a visible manner to both the initial end user, and other potential end users.

The scheduling systems provided in accordance with the present invention thus provide a simple and efficient means for people to make appointments, arrange meetings, and create other sorts of events that occur at an agreed upon moment in time. The systems and methods described herein are particularly useful in communicating over the Internet or World Wide Web, assisted by Email, since they do not require the client to contain any special software that is uniquely suited to only this particular task, but rather operate through standard HTML text as displayed in a standard Web Browser. The scheduling systems are particularly unique in that these systems allow each end user to possess a unique private calendar that communicates with other private and unique calendars of other end users across the transport medium. No user ever sees the private calendar of another, yet messages and invitations sent to other users show up in both calendars. When a current end user wants to propose times for a meeting with an individual who is not currently a user of the system, the system creates a new account and contacts the new user with an e-mail, which in turn provides that individual with a connection to the system and access to a private calendar of his own. That new calendar then becomes part of the overall system and contains the proposal for the meeting as it was sent by the originating end user. In this manner, the systems and methods provided in accordance with the present invention provide a method of extreme proliferation of the scheduling systems claimed herein, thereby making the schedules ubiquitous throughout the Internet through Email. By providing a ubiquitous system, each member of a large segment of the population will have access to private calendar and scheduling systems, and the use of these systems will rapidly become second nature.

The invention is best understood by those with skill in the art by reading the following detailed description of the preferred embodiments in conjunction with the drawings which are first described briefly below.

BRIEF DESCRIPTION OF THE DRAWINGS

FIG. 1C is a block diagram of the interaction between an administration subsystem of the Appointnet system and various other subsystems of the Appointnet system.

FIG. 10D illustrates a simple flow diagram which shows a calendar when a request for date is made. (Calendar of a different date)

FIGS. 16A through 16C illustrate calendars in the monthly, weekly and daily mode created by the Appointnet system of FIG. 15.

FIGS. 17A through 17F illustrate making an appointment with another person using the Appointnet system of FIG. 15.

FIGS. 18A through 18B illustrate making a reminder to oneself using the Appointnet system of FIG. 15.

FIGS. 19A through 19B illustrate announcing a message to another using the Appointnet system of FIG. 15.

FIG. 20 is an illustration of the InBox function of the Appointnet system of FIG. 15.

FIGS. 21A through 21C illustrate the detail available for an appointment made by the Appointnet system of FIG. 15, and the use of a contact log.

DETAILED DESCRIPTION OF THE PREFERRED EMBODIMENTS

Figure 1A:
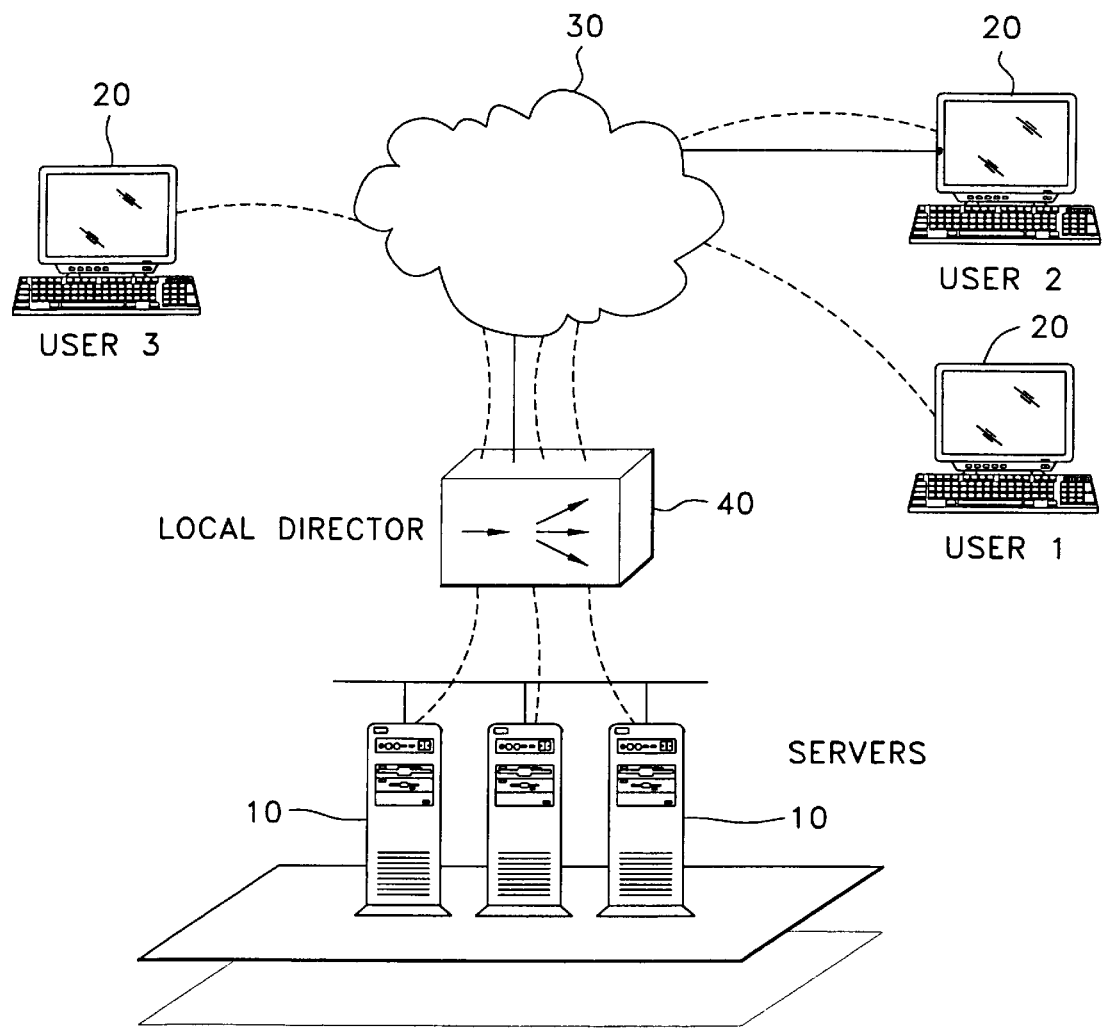
FIG. 1A is a system diagram of the Appointnet scheduling system of the present invention.
Figure 1B:
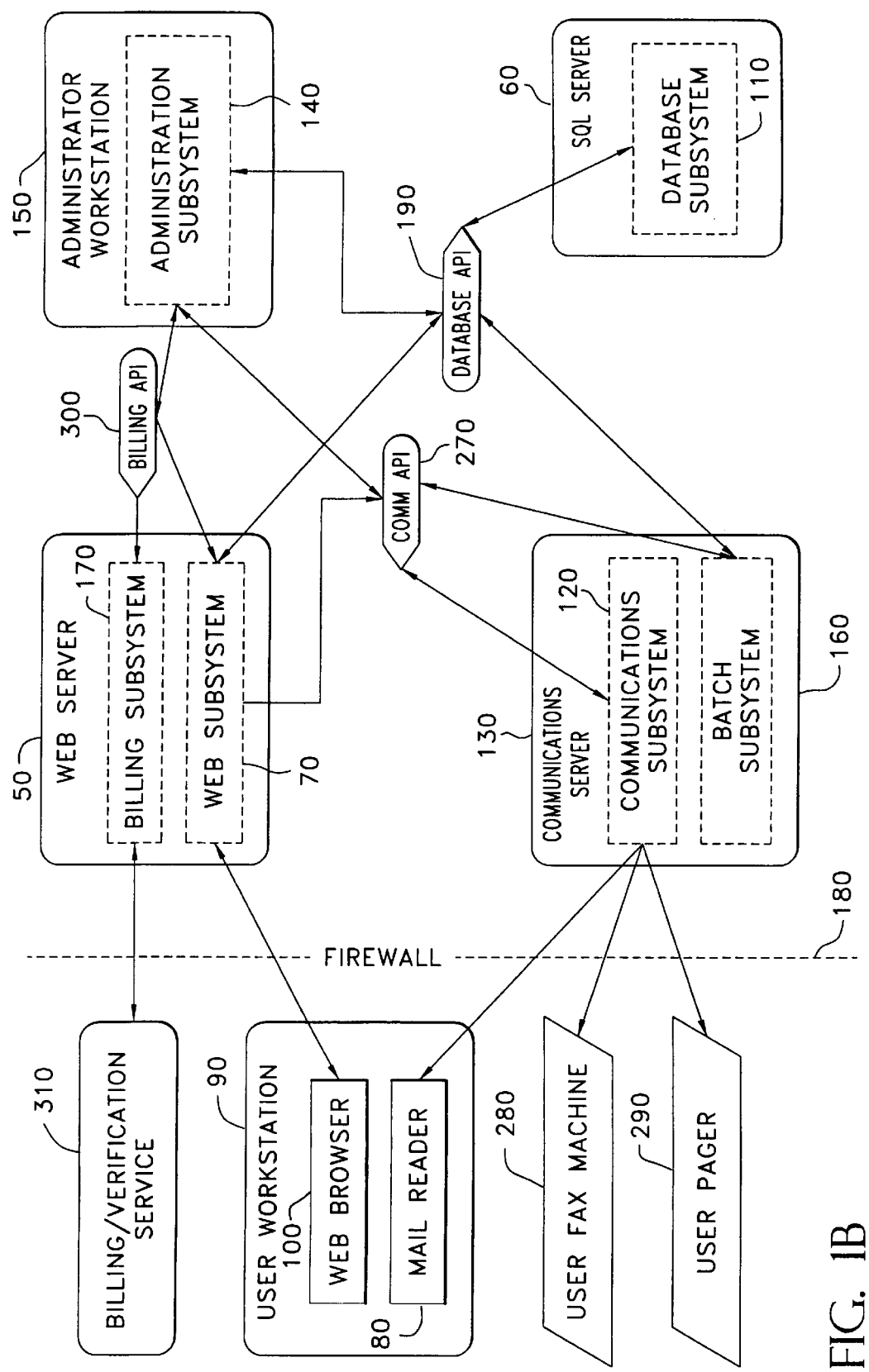
FIG. 1B is a detailed block diagram of the server architecture of the Appointnet system.

Referring now to the drawings wherein like references numerals refer to like elements, FIG. 1A illustrates a multiple server 10 environment which comprises a computer system in accordance with the present invention that allows multiple users to communicate with one another via the system and system clients 20 (also referred to in FIG. 1B as 90). Through this communication, users can schedule meetings and appointments with other users of the system. They can also send announcements to other users of the system, post reminders to themselves. In addition, users can generate schedules that can be viewed by other users when those other users choose to subscribe to those posted schedules.

A transport medium 30 preferably using Internet Protocols (IP), interfaces the clients 20 to the servers 10. A client 20 can be any device that connects to the system via the Internet or other IP transport methods and includes, but is not limited to, such devices as televisions, computers, hand-held electronic devices, wireless electronic devices, and in point of fact, any device that uses IP's and uses a transport medium. Non-limiting examples of the transport medium 30 any backbone or link such as an ATM link, FDDI link, satellite link, cable, twisted pair, fiber-optic, broadcast wireless network, the Internet, the World Wide Web, or even a Local Area Network (LAN), Wide Area Network (WAN), or any other kind of intranet environment such as a standard Ethernet link. In such alternative cases, the clients will communicate with the system using protocols appropriate for the network to which that client is attached. All such embodiments and equivalents thereof are intended to be within the scope of the present invention, The Term "Appointnet" is used throughout to denote systems of the present invention and is a trademark of AppointNet, Inc. a Pennsylvania company with offices on North Columbus Boulevard in Philadelphia, Pa.

A local director 40 routes signals through the Appointnet system to the various servers 10 and to and through the transport medium 30. Preferably, the Appointnet system delivers an inventory of events created by one of the end users to at least one of the other end users of the system. These events are typically appointments on the first end user's Active Scheduling Grid (ASG), sometimes referred to simply as a scheduling grid or calendar. These terms are used interchangeably throughout. In this manner, groups of possible events or appointments between several end users of the Appointnet system can be compared to determine whether there is a commonality of times in several schedules to plan meetings between end users based on such criteria as time, date, length of meeting, place of meeting, and so forth.

Thus it can be seen from the preferred embodiment of FIG. 1A that the Appointnet system as a whole is comprised of a number of inter-connected client devices that communicate with a server 10 through a transport medium 30 preferably using IP standards. Referring to FIGS. 1A through 1E collectively, the two primary servers in the Appointnet system are the Web Server 50 and the SQL Server 60. The SQL Server 60 in this embodiment runs "SQL Server" database management software from Microsoft Corporation. There is also an Administrator Workstation 150 that provides administrative capabilities for the entire system. The Administrator Workstation 150 allows administrators or other operators of this terminal to perform routine operations at effect the system. Such operations include, but are not limited to adding clients, checking account balances, printing reports, updating customer records, performing backups, and maintaining the programs that comprise the Appointnet system. The Administrator Workstation 150 is able to communicate directly with the Web Server 50 and the SQL Server 60.

The Appointnet system of the present invention provides an efficient mechanism through which an individual or groups of individuals can set appointments in time and place; organize events; send announcements; and post reminders in such a way that information is available to selected individuals or groups of individuals. The determination of the scope of the recipient list is at the discretion of the originator of the message. Appointnet preferably uses the World Wide Web as a transport medium for connecting end users with client devices 20 who wish to invite other end users that in turn receive the appointments, events, and other messages. End users in their roles as senders or recipients of messages sent via the Appointnet system use a Web Browser 100 to connect to the Web subsystem 70. By working with a simple set of forms and calendars expressed in standard HTML and visible in the client device, end users access and manipulate the data stored in the Database Subsystem 110 to create messages that are then visible to other end users of the Appointnet system. As a result of these actions the system may invoke the Communications Subsystem 120 in the Communications Server 130 to transmit scheduling information between end users in a form external to the Appointnet calendar paradigm. These transmissions may take such forms as EMail, fax communications, voice communications, pager notification, or messaging to other devices that are not client devices 26. In the current form, non-client devices do not provide two way communications with Appointnet so a recipient of one such communication would be notified that a message awaits them on their Appointnet client. When two way communication becomes possible with these devices, then by definition they become client devices 20.

The Web Server 50 sends client interface information as HTML through the Web Subsystem 70 to a Web Browser 100 software program, and an Email reader 80 that execute within a client device 20. As shown in the configuration described in FIGS. 1A–1E, the Web Server may call CGI scripts that process information from the client. The SQL Server 60 operates in concert with the Web Server 50 and maintains all the end users' account information, financial records, and other associated transaction data as well as all interactions with the Web Server that result in a change in the information in the Database subsystem 110.

The Web Subsystem 70 is responsible for all interactions with the Web Browser 100 in client devices, and serves as the client interface to the Appointnet system. All interactions between client devices and the Database Subsystem 110 occur through the Web Subsystem 70. Internet Information Server 200 (IIS) by Microsoft Corporation is preferably used as the Web Server 50 software. The expression of the user interface presented to end users in their client devices is preferably implemented as HTML and displayed in a standard Web Browser 100. Several of the HTML pages are static and reside on the Web Server to be delivered upon demand by end users operating client devices. A majority of the HTML seen as custom calendars and forms by end users is generated by the Web Subsystem 70 and delivered to the client device upon demand in response to actions taken by end users operating client devices. Calendars, forms for invitations, announcements, and reminders are all unique for each end user and generated by the Web Subsystem using information stored in the Database Subsystem 110.

One of the unique and advantageous aspects of the Appointnet system in a preferred embodiment is that it delivers custom information to each end user as HTML, a standard page mark-up language that is displayed in a predictable manner by a standard Web Browser without fear that important information will become lost or misrepresented. It will be recognized by those with skill in the art that other, non-HTML page mark-up languages or evolved future versions of HTML can be used in accordance with the present invention. This completely removes the requirement for end users to purchase special custom software applications to communicate with each other. The end users can simply read the HTML pages into their existing Web Browsers 100 from the Internet in a way familiar to anyone who has visited any site on the Internet, and similar to the method used now to accept Email from the Internet.

Figure 1D:
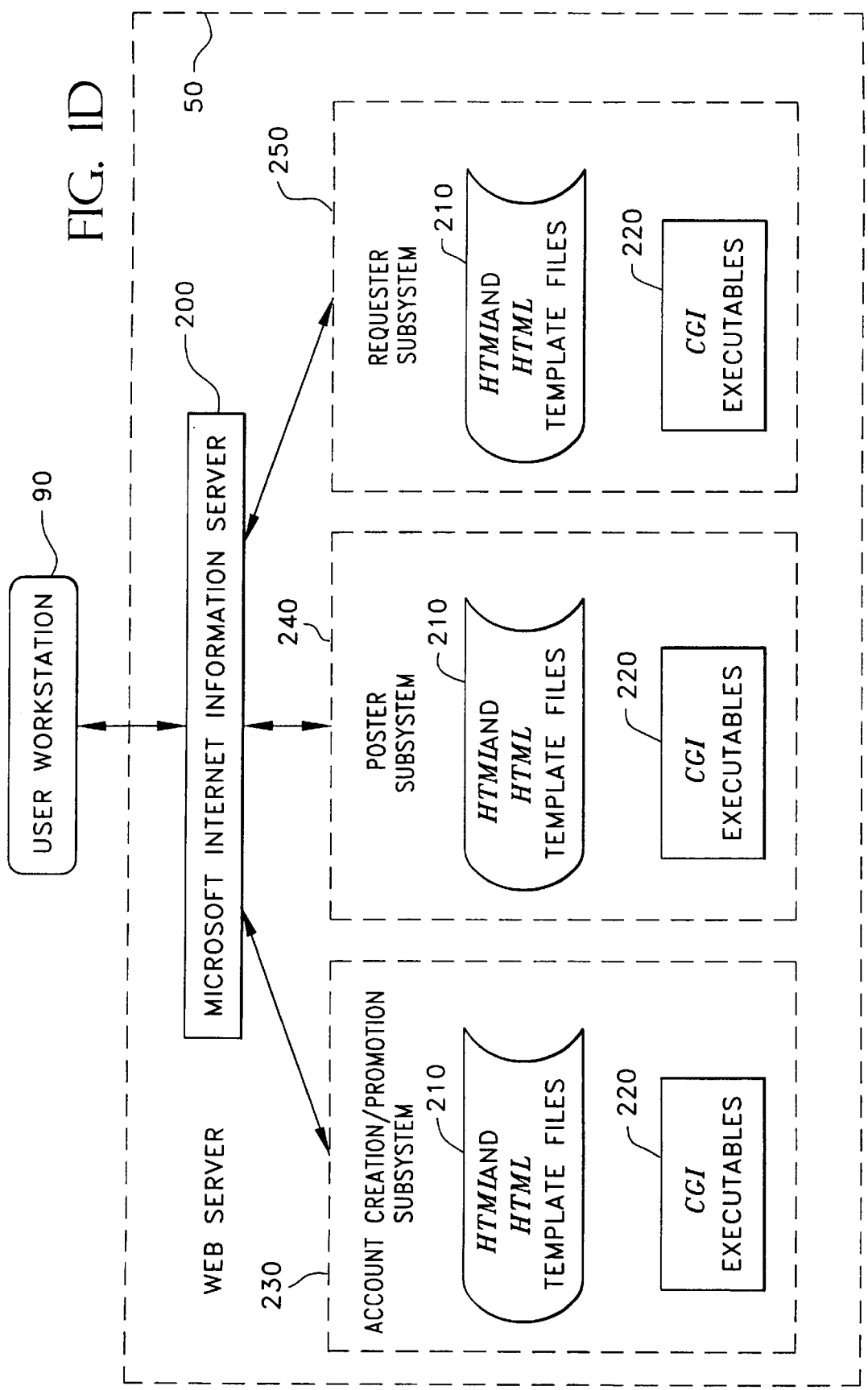
FIG. 1D is a detailed block diagram of the Web Server of the present invention.
Figure 1E:
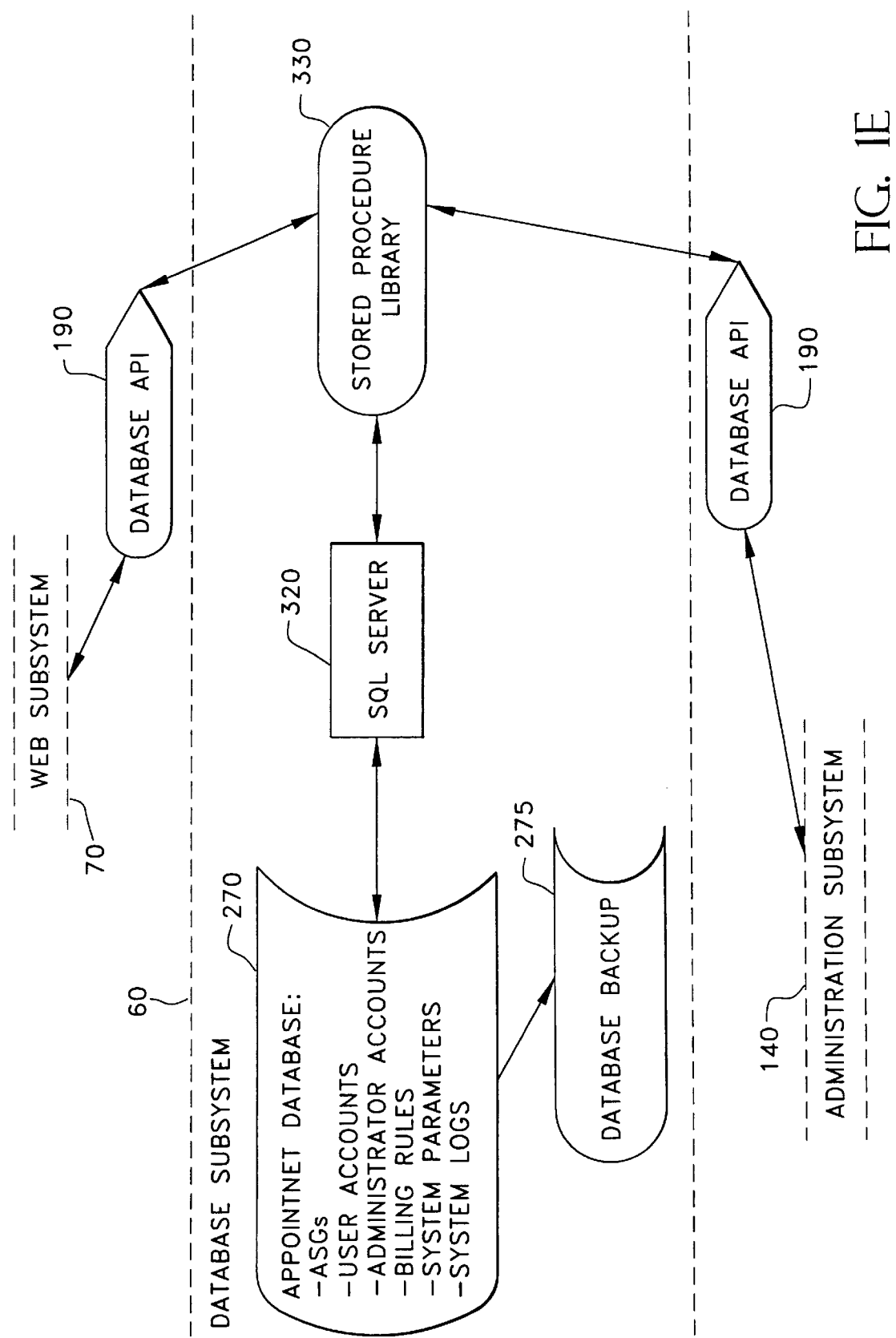
FIG. 1E is a detailed block diagram of the Database Subsystem of the present invention.

For clarity, the HTML files and high level CGI scripts are preferably partitioned into three subsystems as shown in FIG. 1D. The Account Creation/Promotion subsystem 230 controls interactions when there is not yet a client specified. The Poster Subsystem 240 controls poster specific interactions, while the Requestor Subsystem 250 is responsible for requestor interactions. There is also a lower level library of generally useful routines for interacting with the Database, Communication, and Billing Subsystems and performing such generic tasks as filling in HTML templates. These types of lower level routines are known to those with skill in the art.

All of the systems listed above preferably communicate via an Ethernet 100BaseT network, and a 100 megabit Switching Hub. In addition, a second, isolated, network segment exists between the Web Server 50 and the external communications hardware (Internet router). This keeps external traffic isolated from the internal network, as well as providing a dedicated connection between the Web Server and the Internet for maximum throughput. The systems will have an initial configuration of 64 Million Bytes (MB) of Random Access Memory (RAM) for the Web Server 50, and 128 MB for the Database Server 60, both with the capability to be expanded to 256 MB of ECC (Error Checking and Correcting) RAM.

The Web Server 50 is the point of entry to the entire Appointnet system. It determines who the remote user is and makes appropriate decisions while serving the HTML to the client. The Web Server sends HTML to the client User Workstation 90, validates end user passwords, sends logging and transaction information to the SQL Server 60, and performs logical operations, thereby also behaving as a transactional server.

The Web Server's 50 operating system is preferably based on Windows NT 4.0 Server. Windows NT is a multi-platform operating system provided by Microsoft Corporation of Redmond, Wash. This operating system software provides Appointnet with the greatest potential for growth as subsequent versions of Windows NT may well become available for new and different kinds of microprocessors in response to growing demand by a growing number of customers. The current implementation of the Appointnet system preferably runs on Pentium Pro microprocessor based computers. These microprocessors are made by Intel Corporation. Pentium pro based computers can be configured to have more than one microprocessor. This configuration is becoming more common, and since Windows NT 4.0 is an operating system that supports multi-threaded applications it can utilize the full power of dual processor computer systems.

The Windows NT 4.0 server includes IIS, which is a completely integrated Internet application platform. IIS includes a high performance Web Server, an application development environment, integrated full-text searching, multimedia streaming, and site management tools. The security infrastructure is totally integrated with Windows NT Server, enabling an easy to maintain and highly secure Web development and deployment environment. IIS also includes support for HTTP byte-range browsers to begin receiving data from any part of a file for enhanced performance. HTTP is a term of art and stands for Hyper-Text Transport Protocol.

Another important factor in deciding to use Windows NT is that there is a wealth of available development tools, developer support, and end-product support for this operating system. Microsoft has, by far, the most comprehensive and well-maintained system in place for providing the information and tools necessary to create the planned Appointnet system. In addition, there are many third-party tools available which will facilitate development. Using the IIS server, for every connection to the Web Server 50, 256 kilobytes (K) of RAM usage is reserved. For every 25 MB of memory allocated to the IIS server, it will support 100 simultaneous users. In a preferred embodiment the Web Server will be configured with a Pentium Pro(P6) 200 Megahertz (MHZ) central processing unit (CPU), 64 MB of ECC RAM / up to 256 MB of ECC RAM, a graphics adapter capable of showing 1024×768 pixels with a depth of 8 bits, a 15 inch monitor, a PCI Fast/Wide SCSI-2 I/O adapter, one PCI 10base2 Ethernet adapter and one PCI 100baseT Ethernet adapter, a keyboard and a mouse, a 3.5 inch floppy drive, a Compact Disk (CD) Read Only Memory (ROM) disk drive, and JAZ disk drive (JAZ is a trademark of the Omega Corporation), and a 2 Billion byte (GB) fast/wide SCSI-2 drive as a boot drive. (PCI is a standard bus configuration in computers with Intel microprocessors, SCSI is an acronym standing for Small Computer Standard Interface. The "-2" indicates the version of the SCSI specification in use.)

The operators and managers of the Appointnet system may create, delete, and update account information by utilizing the Administration Subsystem 140 in an Administration Workstation 150. Clients may also request that the Appointnet system remind them of appointments, thus encouraging them to review their schedules periodically. End uses do this by submitting requests for asynchronous notification; there will be handled by the Batch Subsystem 160 at well defined intervals.

The Billing Subsystem 170 is responsible for credit card verification and credit card billing. The Database, Communication, and Billing Subsystems execute essential services for other parts of the system, and will therefore have well defined application program interfaces (API) as well be recognized by those with skill in the art. The Appointnet system is protected for the Internet by a "firewall" 180 which is a good safety precaution, and important with respect to the present invention due to the sensitive and confidential nature of some of the material in the Appointnet database.

The Database Subsystem 110 stores all persistent information pertaining to client accounts, calendars, administrator accounts, billing parameters, as well as general dynamic system information. All interactions with the Database Subsystem 110 are done through the Database API 190, which defines the interface to a library of stored procedures 330. These are used to implement high-level database functions and to shield the details of the database implementation from the other subsystems. The Database Subsystem 110 is preferably implemented using a Microsoft SQL Server, and is backed up on a regular basis.

The Administration Subsystem 140 provides an interface for operators and managers of the Appointnet system to modify at 260 the Appointnet database 270, print reports, view system data and log user comments and complaints. The Administration Subsystem 140 provides a collection 260 of access forms, queries, reports, and modules to implement the administration interface. Since administrators have the power within the system to force most actions, the Administration Subsystem will interact with the Communications, Database, and Billing Subsystems.

The Communications Subsystem 120 interfaced to the Comm API 270 will be used to notify users of appointment requests and confirmations. Users may be notified by phone, fax 280, Email, or pager 290, or other communications devices which can be contacted by the system. Some portable telephones and pagers have Email addresses and so will be contacted by the Email system, others have only phone numbers and the Microsoft TAPI interface may also be used as a means of communication. Other interfaces may be utilized as the application so demands.

The Batch Subsystem 160 will run periodically to send out grouped notifications. It will access the Database Subsystem 110 to determine what notifications are required, and uses the Communication Subsystem 120 to make those notifications. The Billing Subsystem 170 will be used to verify and bill credit cards and communicate through the Billing API 300 to the Administration Subsystem 140, and potentially to an outside Billing and Verification service 310 which could be used to perform the billing function for the Appointnet system.

The Database Server 60 which implements that Database Subsystem 110 of the present invention, is a server that maintains all associated logging and transaction information for the Appointnet system. Through the Appointnet Database 270 (which is backed up by a backup database 275 for safety purposes), the Database Server 60 logs client setup and account creation information, stores information for individuals creating calendars and changes made to that information, maintains user account information, maintains account balances, produces and prints reports, hosts backup operations, and performs statistical calculations for the entire system.

The Database Server 60 uses the Windows NT 4.0 operating system and utilizes the Windows NT SQL Server 6.5 shown at 320. The SQL Server 320 communicates with a set of stored procedure calls (to be discussed more fully below) in library 330.

The Database Server 60 is preferably a dual processor computer with a Pentium Pro microprocessor. The SQL Server 320 is optimized specifically for the Windows NT threading model. Each connection to the database and its associated work may be handled by a separate thread within the SQL Server process space. Since Windows NT can distribute threads to multiple processors for execution, when many users simultaneously send queries to SQL Server 320, each of those requests may be distributed across the multiple processors for execution. Because of this design, the SQL Server 320 is well suited for high processing loads and scales extremely well on Symmetric Multi-Processing (SMP) servers. SQL Server 320 will efficiently use additional processors to its advantage in high volume environments. The dual processor machine is sufficient for the type and amount of transactions that it will be performing, however if it proves insufficient, the database can be "striped" to two or more machines to distribute the server load.

The disk subsystem of the Database Server 230 is a vulnerable and crucial server element. Due to the mission critical design of this subsystem, it is preferable to utilize a Level 5 RAID. As RAID is an alternative to standard SCSI hard disk drives, a RAID system provides automatic recovery from hard drive failures. Level 5 RAID systems provide the best balance between cost and level of data protection. A Level 5 RAID system uses multiple hard disk drives, on which the stored data is recorded redundantly using a scheme by which the data on the disk can be reconstructed if one of the disk drive units in the RAID fails. In the event of failure, the failed drive can be removed from the RAID system while it is still operating, and a replacement drive can be installed. The RAID system will re-generate the data and return itself to full protection capability. The data stored on the disk subsystem remains available for normal processing, that is from the time the drive failures to the time the RAID system is returned to full protection capability. Other levels of RAID which are less costly do not offer this type of data availability and could translate into costly system downtime.

Statistical calculations will be performed by the Database Server, along with other types of report generation. Specifically, IIS can log directly to an Open Database Connectivity (ODBC) standard data source. This makes the availability of the data collected by the Database Server about client activity on the system to be more readily available and easier to process into logical reports. Preferably the Database Server system is configured with a dual P6-200 MHZ CPU, 128 MB ECC / up to 256 MB ECC RAM, a graphics adapter capable of showing 1024×768 pixels with a depth of 8 bits, a 15 inch monitor, a PCI Fast/Wide SCSI-2 I/O adapter, one PCI 100baseT Ethernet adapter, a keyboard and a mouse, a 3.5 inch floppy drive, a CD ROM drive, a JAZ disk drive, a 2 GB PCI Fast/Wide SCSI-2 hard disk drive, two 9 GB PCI Fast/Wide SCSI hard drives (Level 1) or an 8 GB RAID Subsystem (LEVEL 5), and a 24 GB DAT SCSI (2 MB per minute) tape back up unit.

Initially, there will be one operator workstation used for administering the system. As the need for additional workstations arises, additional operator workstations can be added by adding additional computer systems, installing the administration software and connecting them to the LAN. Operator Workstation machines preferably utilize the Windows 95 operating environment created by Microsoft Corporation. The Operator Workstations are configured with a Pentium CPU running at 166 MHZ, with 32 MB Extended Data Out (EDO) RAM, a graphics adapter capable of showing 1024×768 pixels with a depth of 8 bits, a 15 inch monitor, one PCI 100baseT Ethernet adapter, a keyboard and a mouse, a 3.5 inch floppy disk drive, a CD ROM drive, a JAZ disk drive, and a 2 GB enhanced IDE hard disk drive.

In accordance with the invention, in order to set up a calendar with the system of FIGS. 1A–1E, the end user first establishes an account with Appointnet because that end user wishes to set up appointments with one or more individuals. This end user then is given a private personal calendar by the Appointnet system. The end user may create an ASG with the Appointnet system. This ASG is then published and made available to other users of the Appointnet system. While creating this ASG that end user may specify which other end users may see that ASG. Those end users are then notified by the Appointnet system that the ASG is available to them. The calendar is delivered through the Internet using standard Internet Protocols to the client [20] as HTML, and viewed by the end user(s).

Figure 15:
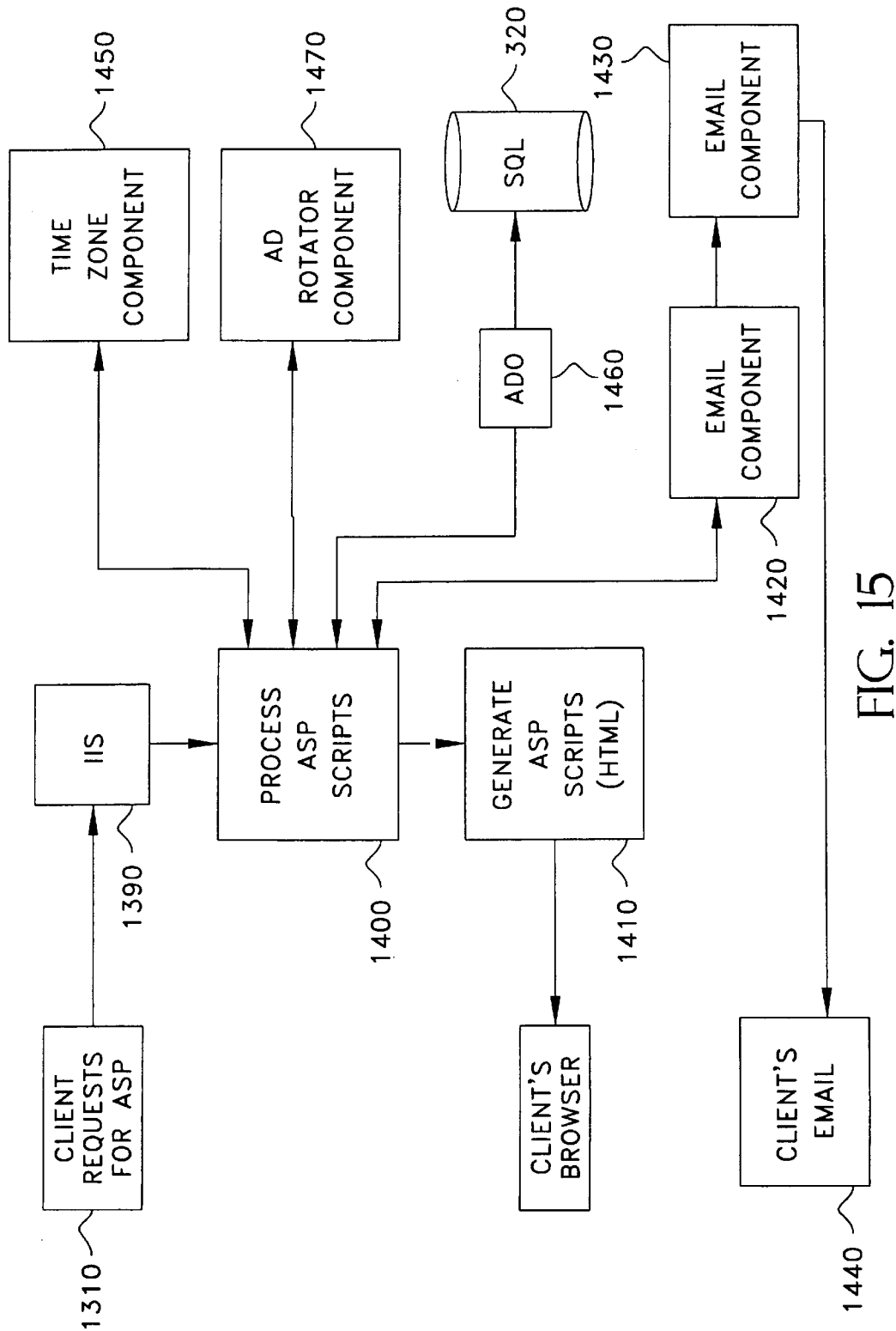
FIG. 15 is yet a further preferred embodiment of the system architecture of the Appointnet system of the present invention.

A still more preferred embodiment of the Appointnet system of the present invention is shown in FIG. 15. A distinct advantage of the system found in FIG. 15 is that it can run as a single server, and all of the functionality of the prior servers can be implemented on the single server using a virtual server environment, or more simply with subroutines and stored procedures. As the system acquires more users, additional servers with the same functionality can easily be integrated to provide seamless access and processing for all the throughput. Preferably the system of FIG. 15 runs on a computer with a Pentium Pro 200 microprocessor, Windows NT 4.0 operating system, and the SQL Server 320. Even more preferably the computer would have 256 MB of RAM and a Level 2 RAID 5 hard disk drive array holding many gigabytes of information. It will also be recognized by those skilled in the art that the Appointnet system described in accordance with the invention can utilize any appropriate operating system other than Windows NT such as for example, but not being limited thereby, Windows 95 or any variety of UNIX.

In the embodiment of FIG. 15, a client 20 sends a request 1380 to the IIS 1390 for Active Server Pages (ASP). Rather than utilizing the CGI scripting environment and interpreter described above, the ASP's are processed at 1400 and HTML is generated by ASP scripts 1410. These HTML pages are then sent through the transport medium to the Web Browser software running in the client machine.

When an end user wants to send a notification of the invitation from his client machine to a different end user, a slightly more involved process occurs. The end user selects a form entry presented in the Browser running on his client machine. That form is sent to the Appointnet system, it is processed 1400 and an Email is generated by the Email component 1420 and sent to the second end user by the Email server 1430. The Email server could be a separate piece of computer equipment, or integrated within a single piece. The Email invitation is then sent to the other client 1440 where it is read in an Email reader. The Email reader is preferably enabled to allow the end user to click on the hypertext link in the Email, and doing so causes that end user's Web Browser to become active and automatically link to the Appointnet Internet site.

Preferably, a time zone component 1450 is provided that calculates time zones and ensures that reminders, invitations, the scheduling of meetings and announcements appear in the correct times when messages are sent across time zones. More preferably, the time zones are always referenced to Greenwich Mean Time. The time zone component of the present invention is custom software that has been programmed in Visual C++, a product of Microsoft Corporation.

In order for the ASP scripts to be processed, the SQL database 320 must be accessed. This is preferably accomplished through the Active Data Object (ADO) interface 1460 which provides the interface between the SQL Database 320 and the IIS 1390. As has been previously described, the SQL Database contains Database Tables and stored procedures which will be discussed in more detail below.

An important aspect of the Appointnet system of FIG. 15 is that in practice, Appointnet will generate revenue by selling advertising on its Web pages to a variety of advertisers. Thus, an Advertisement Rotator Component 1470 is provided to the system of FIG. 15. This component 1470 can interface with the IIS 1390 so ads are placed at particular intervals and in particular places on the Web pages, including specific time slots in a user's calendar, as these pages are viewed by end users operating client devices communicating with the Appointnet system via the transport medium. This Advertisement Rotator Component 1470 is a standard component used by other World Wide Web site developers.

The following is a description of some of the more important subroutines. Tables 1–6 below set definitions for the various fields used by the Appointnet system.

TABLE 1

USERS

| Users | Description |
|---|---|
| UserID | ID of user |
| Password | Password |
| EMail | EMail address |
| FirstName | |
| MiddleName | |
| LastName | |
| Title | |
| OrganizationName | |
| Address1 | |
| Address2 | |
| City | |
| State | |
| Zip | |
| Country | |
| HomePhone | |
| WorkPhone | |
| FaxPhone | |
| MembershipStatus | |
| DateUpdated | |
| DateJoined | |
| ViewTimeZone | the user's current time zone |
| ViewGrain | how many minutes in each row (i.e., 60 show by hour) |
| ViewDays | days in the current view |
| SentType 1 | |
| WantPassword | do they want password EMailed to them |
| DayStart | time of the start of their day |
| DayEnd | time of the end of their day |
| mNotes | |
| mPermission Strings | strings that allow extra features |
| mCanned1 | canned messages |
| mCanned2 | |
| mCanned3 | |
| mCanned4 | |

TABLE 2

GROUPS

| Groups | Description |
|---|---|
| GroupID | |
| UserID | ID of user who created |
| LinkText | link text creator used |
| Location | |
| Duration | duration of event |
| Subject | |
| GroupType | see table of slot types |
| AcceptCount | how many slots can be accepted |
| Permission | what permission is required |
| mMessage | |
| mToEmail | EMail address of who it was sent to |
| CreatorEmail | EMail of creator |

TABLE 3

VIEWS

| Views | Description |
|---|---|
| ViewID | |
| GroupID | ID of group this view is looking at |
| UserID | ID of owner of view |
| LinkText | user's private link text |
| Visible | |
| mNotes | private notes |

TABLE 4

SLOTS

| Slots | Description |
|---|---|
| SlotID | |
| GroupID | ID of what group this slot is in |
| UserID | User ID of creator |
| Start | start time/date of slot in GMT - Greenwich Menu Time |
| SlotType | see slot types |
| Link | raw link text for overlay (insert) |

TABLE 5

EMail ADDRESSES

| EMail | Description |
|---|---|
| UserID | user ID to group EMail addresses |
| EMail | EMail of someone who UserID knows |
| Name | their name |

TABLE 6

SLOT TYPES

| Slot Type |
|---|
| Cancelled |
| SimpleInvite |
| Confirmed |
| SystemOverlay |
| SignUpSheet |
| Announcement |
| Reminder |

Several definitions are also useful. A "Group" is a database record that is unique for each appointment, announcement, or reminder made in the system. A "View" is a database record which allows an end user to view an appointment, announcement, or reminder made in the system. Each end user operating a client device can see an appointment, announcement, or reminder in the system because the end user has a "View" record that points to a "Group" record. The "Group" record is shared by all clients who can see an appointment, announcement, or reminder in this system ("Event"). A "Slot" record is a database record that contains information about a time slot found in a calendar. The "Slot" records are grouped by "GroupID" and belong to a "Group" record. "Slots" are shared by all end users who can view appointments through their client devices. "SlotTypes" is a field found in the Slot record. The SlotTypes field hold information that sets the state associated with the appointment, announcement, or reminder associated with that time slot.

Figure 2A:
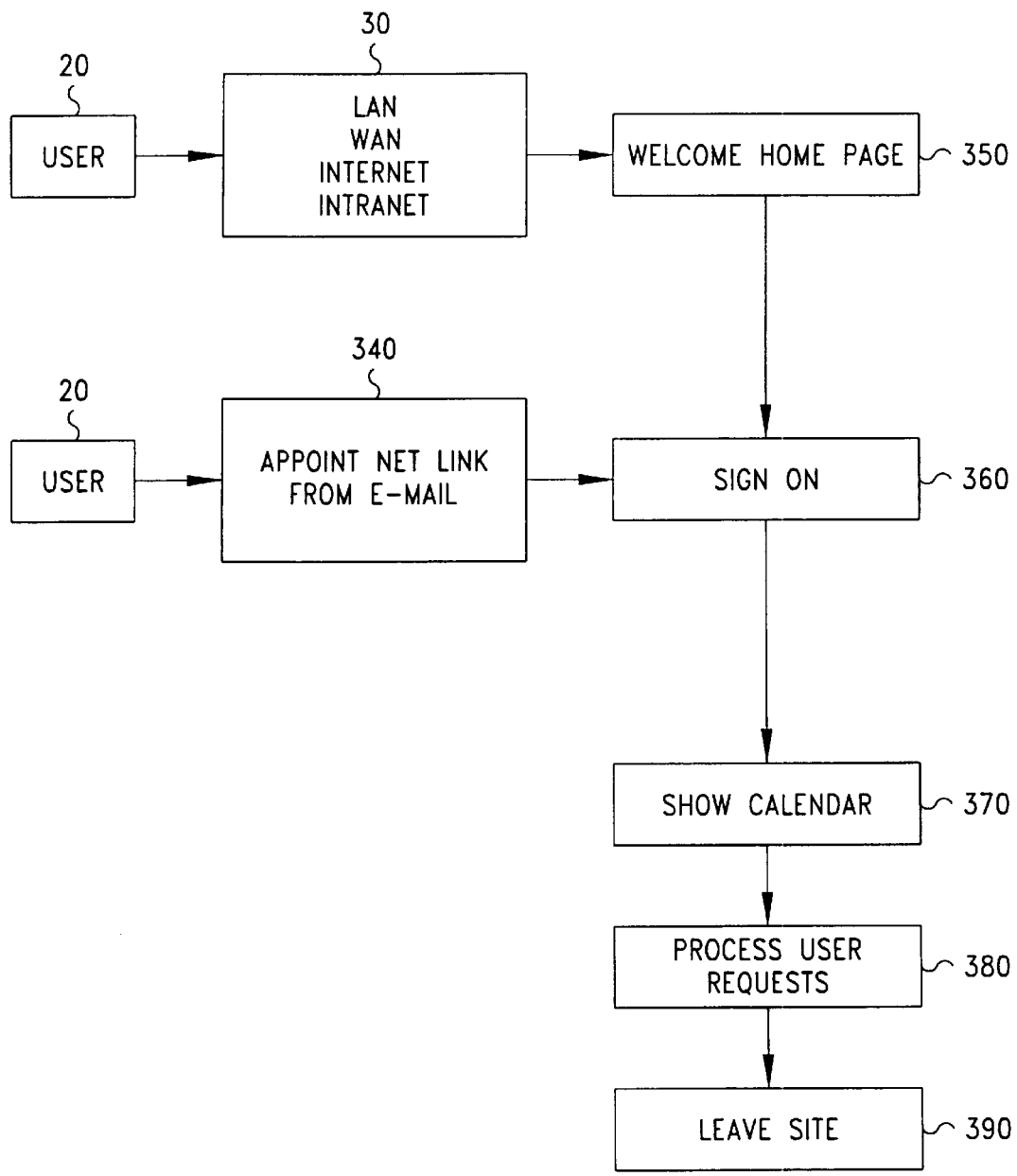
FIG. 2A is a flow diagram of a preferred embodiment of the basic Appointnet system of the present invention.

Referring to FIG. 2A, client devices 20 access or are accessed by the Appointnet system through the transport medium 30 by way of a Web Browser or through a text hyperlink found in an Email message 340. If the end user accesses Appointnet through the transport medium 30 he will encounter the home page of the Appointnet web site 350. From this home page, end users can choose to go further and sign in 360. If the end user chooses to access the Appointnet site from his Email system he will also come first to the home page of the site 350 from where he can proceed to sign in 360. Immediately upon sign in, a personal calendar unique to that end user is shown 370 in the client device 20. The use of sign in procedures and passwords preserves client confidentiality and sensitive information which is desired by many users. From this personal calendar end users can request various services from the system, and the system in turn processes those requests 380. When the end user is finished he exits the site 390.

Figure 2B:
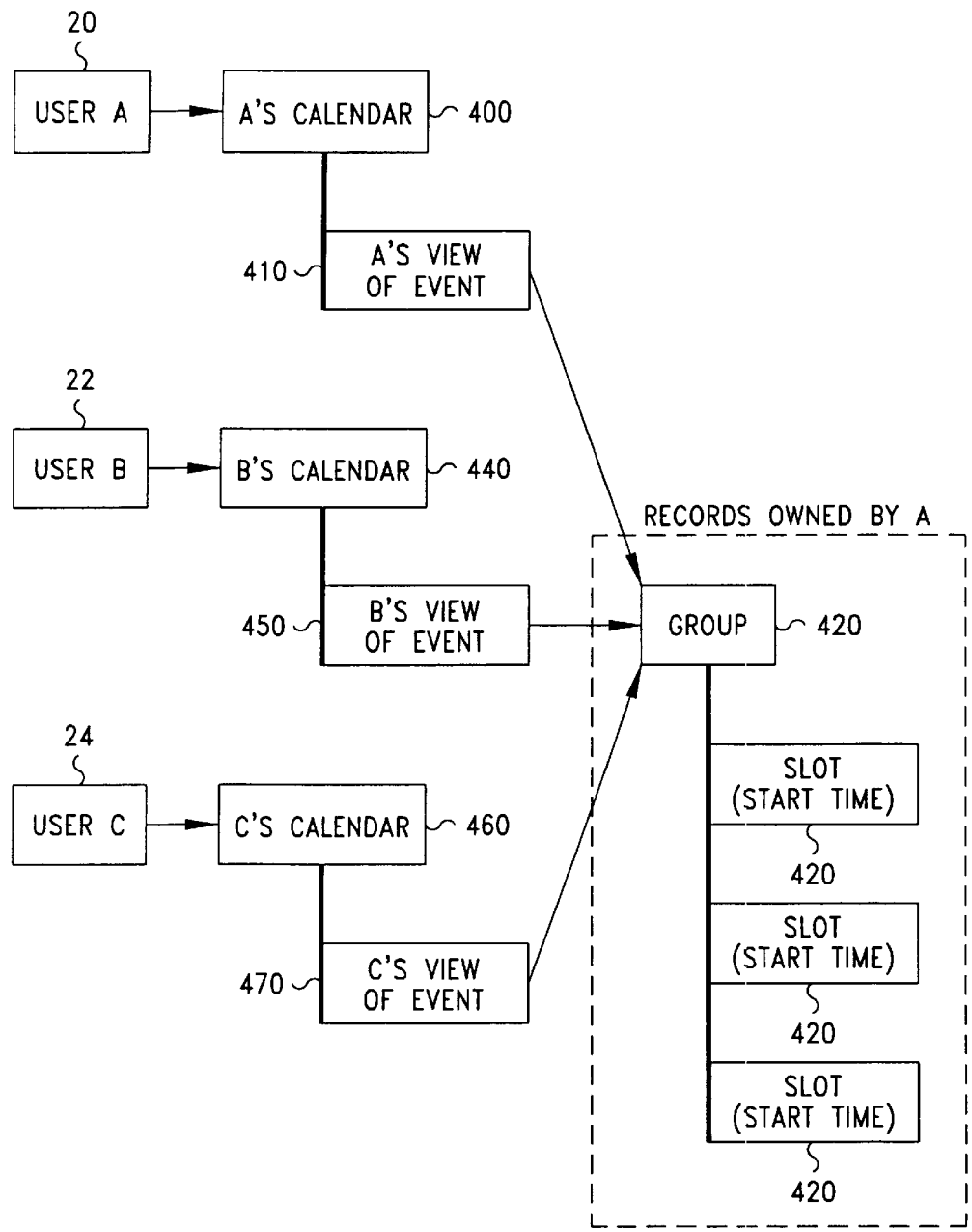
FIG. 2B is a flow diagram illustrating the process whereby users of the Appointnet system can see events that have been created by a first user.

FIG. 2B illustrates view sharing in accordance with the Appointnet invention. Clients B and C, respectively 22 and 24, can see the Event. The Event is represented by a Group record. This Group record has been created by the Appointnet system as it processed end user requests 380 generated at the client device 20 by the end user. Access by end users to these Events is managed by View records. Each end user who can see an Event in his calendar can do so because he has a View record that points to a Group record. Those View records are created by the Appointnet system when the creating end user sends event messages to others on the system. When an invitation is sent a Group record is created, then a View record is created so the sender can see the Group record, and then another View record is created to the recipient can see the Group record. A different View record is created for each end user who is allowed to see the Group record. In this way real time capabilities are maintained, because all the end users can see the contents of one record, and when that record changes all the end users can see it at the same time.

In a simple appointment, the Group record is shared by two end users, while in other kinds of messages, more than two end users can view the information. This is shown in FIG. 2B. Client B's calendar 440 can access the group of records created by client A. This is done through client B's detail view of the event 450. Similarly, client C's calendar 460 can access the group record created by client A through client C's detail view of the event 470.

Figure 3:
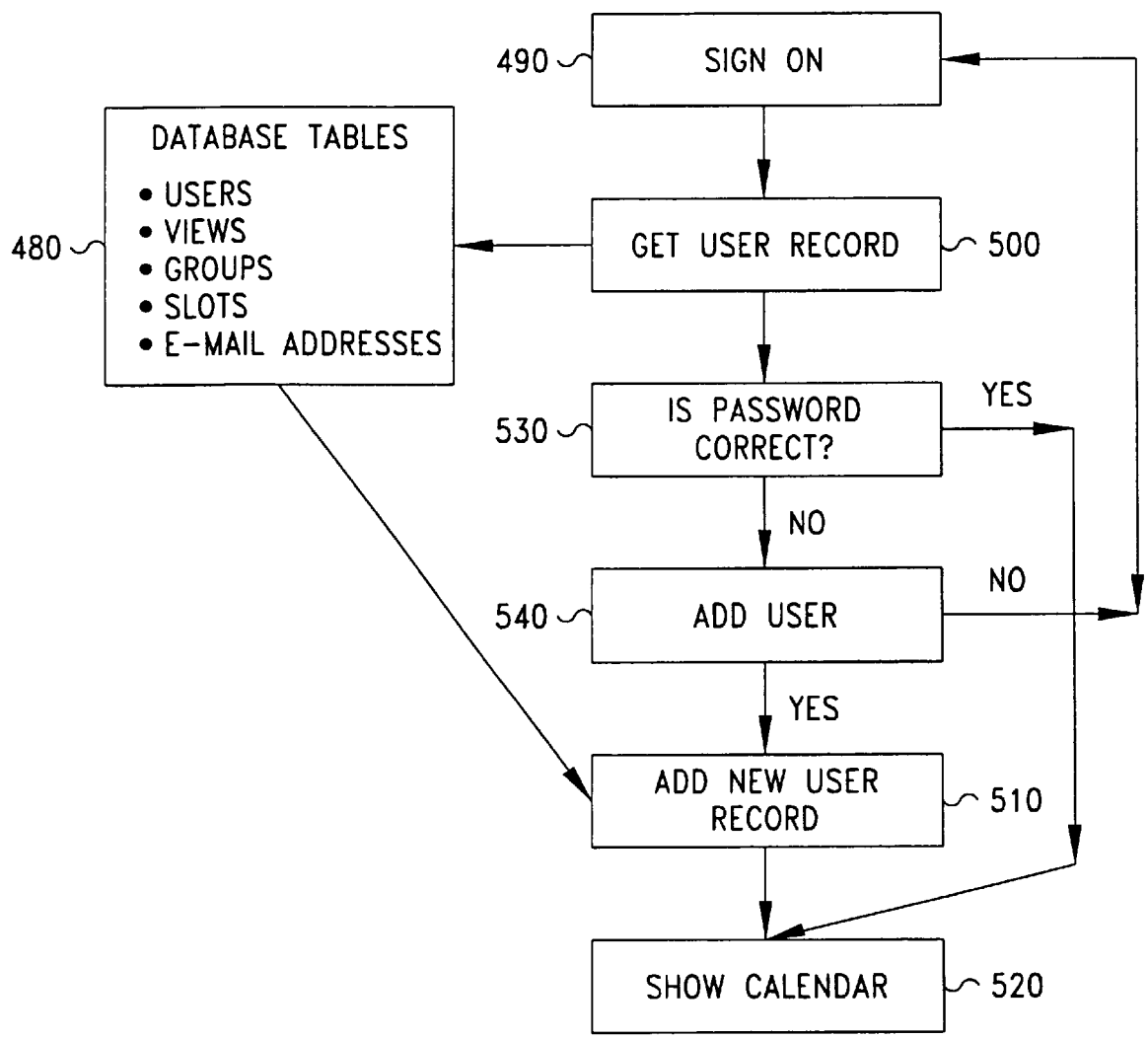
FIG. 3 is a flow diagram of the sign-on process for users of the Appointnet system wherein new users are added to the system if they have not previously signed on to the system.

Referring now to FIG. 3, and discussed above, the Appointnet system creates records in Database Tables 480. These tables include "Users" (end user identification), "Views", "Groups", "Slots", and "Email" address for other end users. When an end user signs in at 490 with an Email address and password, the system checks the database 500 and 480 to see if a record exists with that combination 530. If such a record does exist, the personal calendar belonging to the end user represented by the unique combination of Email address and password is shown. If no match is found, a new account can be created. (The password can be re-entered at the end user's discretion).

Figure 4:
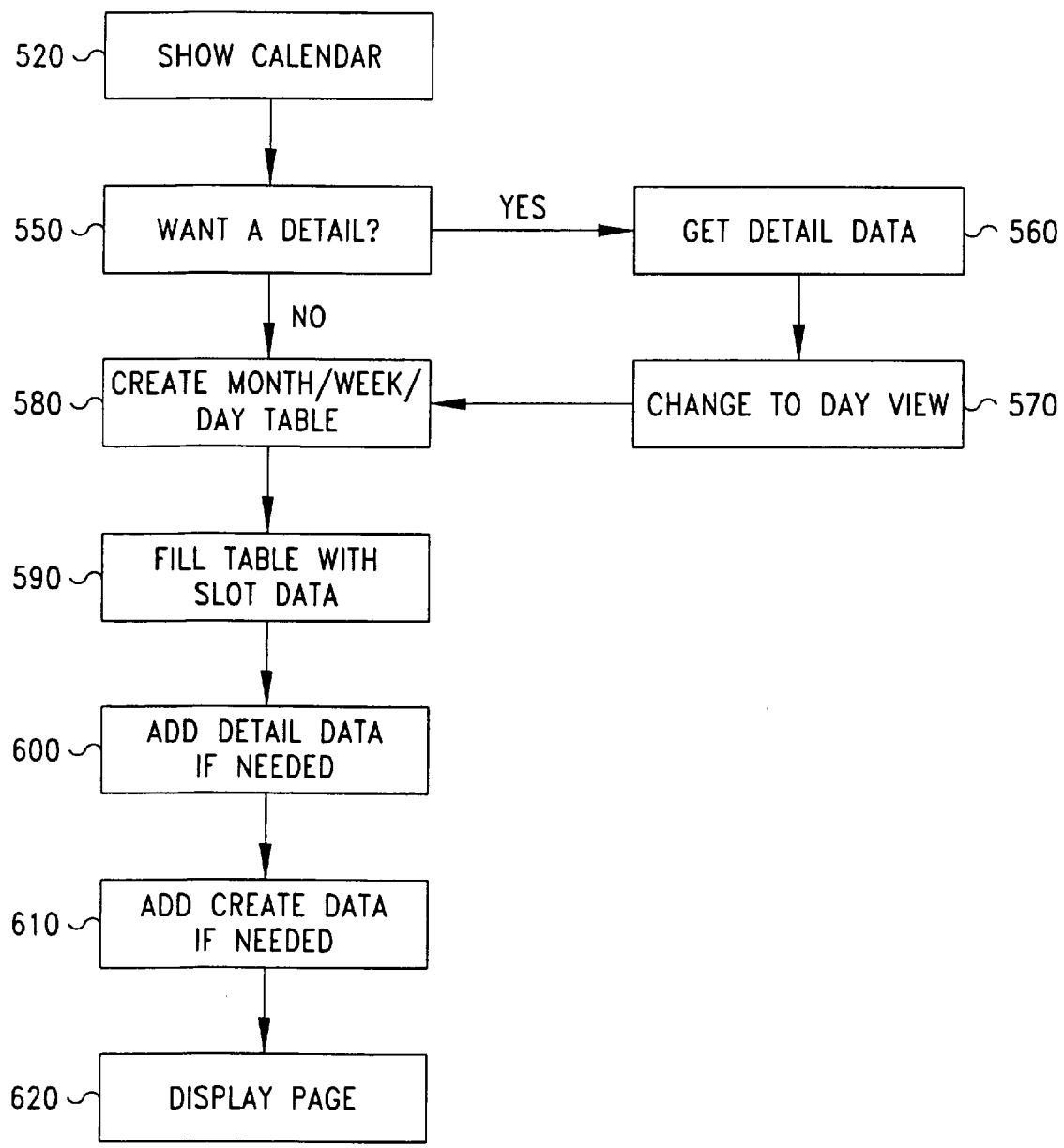
FIG. 4 is a flow diagram of the routine in the Appointnet system which shows a user's calendar created by the system.

The primary purpose of the Appointnet system is to allow end users to send messages about events from their calendar to the calendars of others. FIG. 4 shows the steps the Appointnet system takes to show a calendar 520. Since the same basic calendar routines are used to show all kinds of calendars including ones used to display detail pages, the system first checks to see if a detail page is requested 550. If this is a request for detail 550, this request causes the Appointnet system to generate the detail data 560, and change the calendar type to a day view 570. Next the Appointnet system creates a data structure in memory of a table for the kind of calendar to be displayed 580. That data structure calendar is filled with the slot data 590. If the system is making a detail view, then the detail information is added 600. If the system is making a page used to send some kind of event message then "Create Data" is added 610. Lastly the page is displayed 620.

Figure 5:
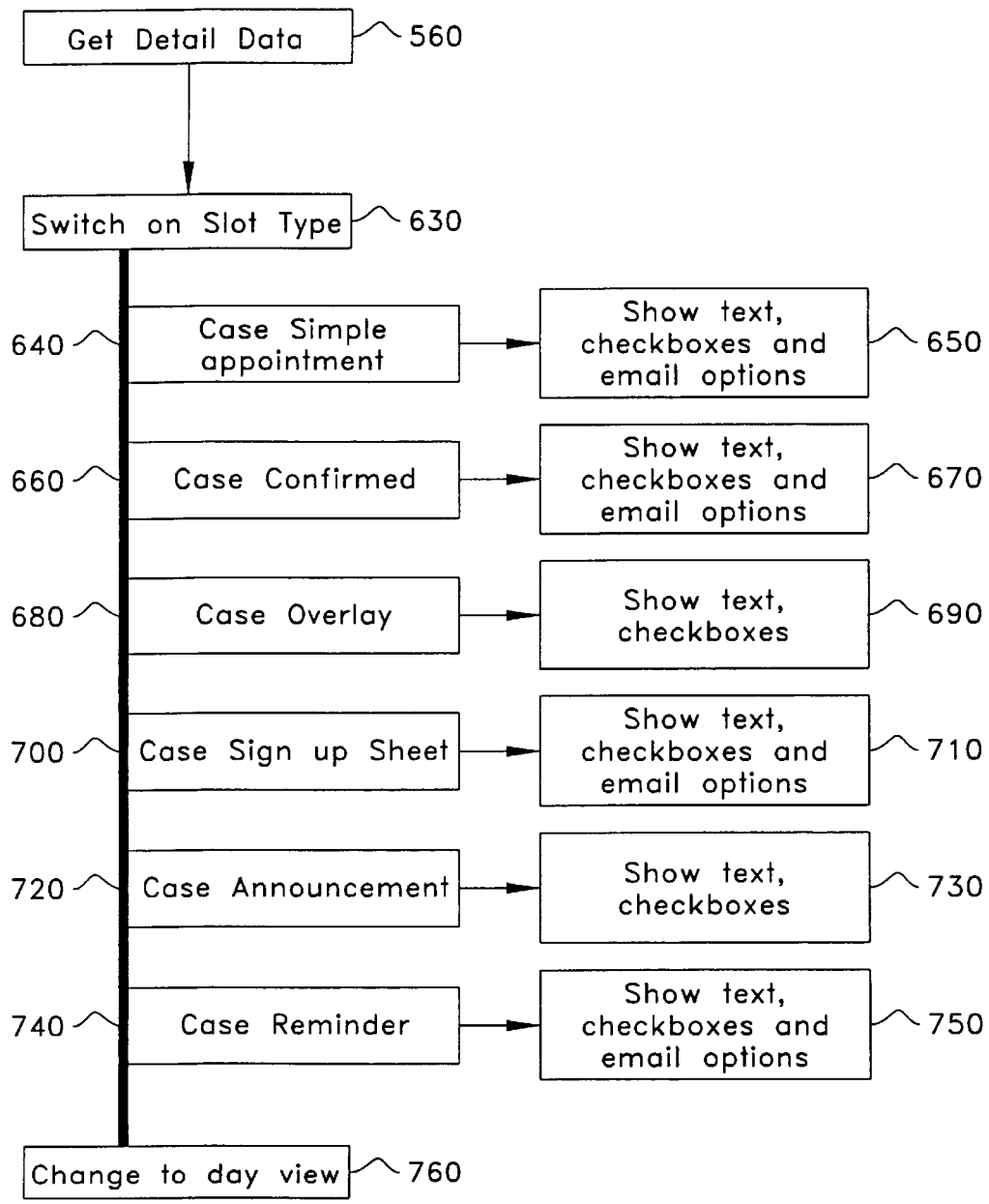
FIG. 5 is a flow diagram of a routine in the Appointnet system which gets data showing a detail for a single appointment.

Referring to FIG. 5, in order to generate the detail data 560 for a particular kind of appointment, the system must switch on its "SlotTypes" 630 (see tables 2, 4, and 6). The following mutually exclusive options are available in this switch. Each of these options represents different types of event messages sent by the Appointnet system.

Case 1: Show a detail page for a simple appointment 640. This requires the system to generate text, check boxes, and Email options suited for only that kind of appointment 650; and then the system fills the detail page with information from the "View" record, "Group" record, and the "Slot" record that pertains to this particular event.

Case 2: Show a detail page for a confirmed appointment 660. This requires the system to generate the text, check boxes, and Email options suited for only that kind of appointment 670; and then the system fills the detail page with information from the "View" record, "Group" record, and the "Slot" record that pertains to this particular event.

Case 3: Show the detail page for an element of a calendar overlay 680. This requires the system to generate the text, suited only for a calendar overlay message 690.

Case 4: Show a detail page for a sign-up sheet 700. This requires the system to generate text, check boxes, and Email options suited for only that kind of appointment 710; and then the system fills the detail page with information from the "View" record, "Group" record, and the "Slot" record that pertains to this particular event.

Case 5: Show a detail page for creating an announcement 720. This requires the system to generate text, check boxes, and Email options suited for only that kind of message 720; and then the system fills the detail page with information from the "View" record, "Group" record, and the "Slot" record that pertains to this particular message.

Case 6: Show a detail page for creating a reminder 740. This requires the system to generate text, check boxes, and Email options suited for only that kind of appointment 750; and then the system fills the detail page with information from the "View" record, "Group" record, and the "Slot" record that pertains to this particular event.

When the specialized information is gathered and formatted is it inserted into the day view of a calendar 760.

Figure 6:
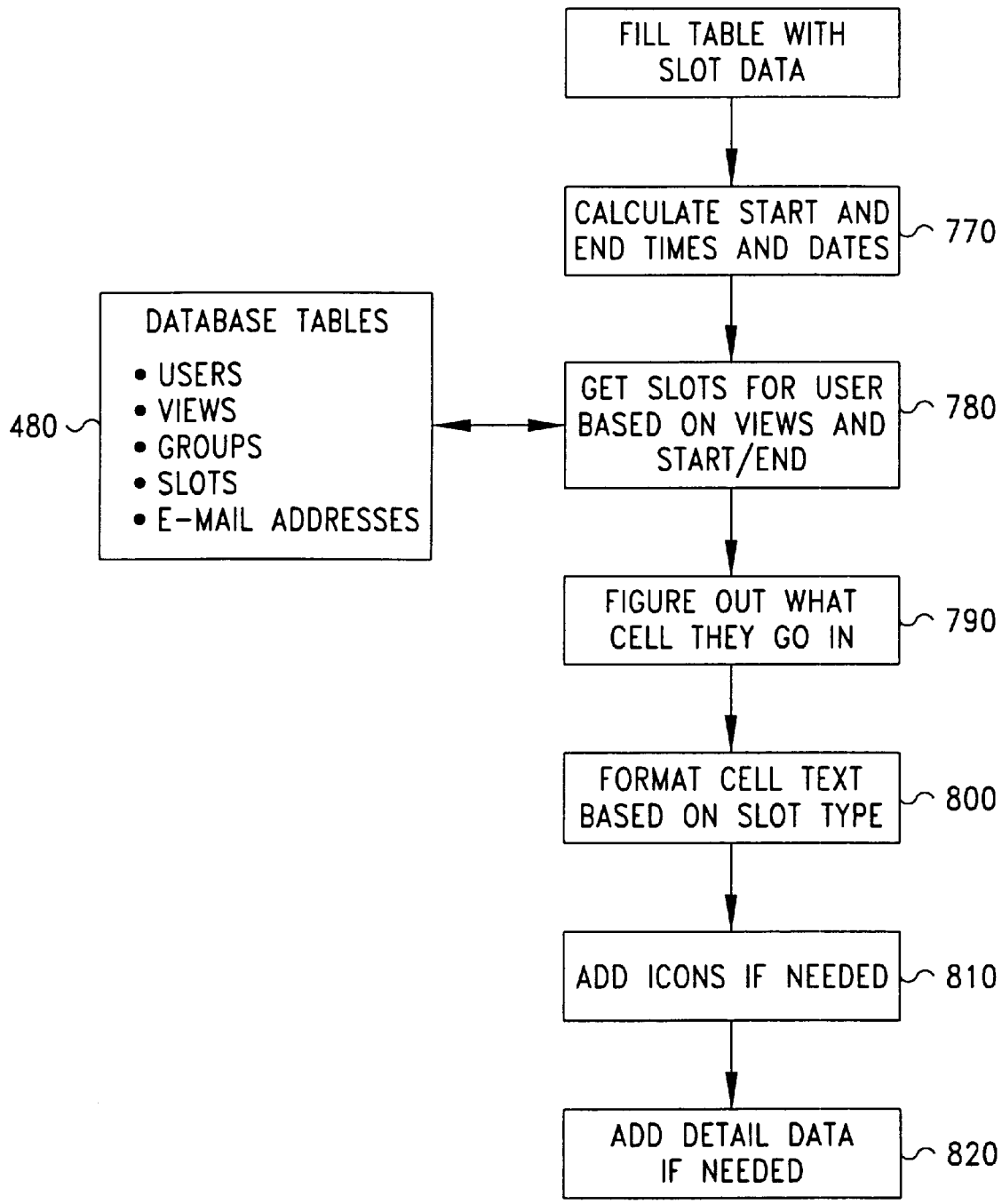
FIG. 6 is a flow diagram of how data for appointments are displayed in a calendar.

FIG. 6 details how a calendar is filled with "Slot" data 590 is accomplished. First the "StartTimes", and "EndTimes", and associated dates, are calculated 770. (Note: Since events are time zone corrected it becomes necessary to determine the date after the times. One end user could be on the East Coast at 1 AM Tuesday morning, and the other end user could be on the West Coast at 10 PM Monday night.) The time "Slots" for that end user's "View", "StartTimes," and "EndTimes" are obtained by accessing the Database Tables 480. The system then determines into which cell on the calendar the data goes 790, formats the cells based on the "SlotType" 800, adds any associated icons as needed 810, and then adds the detail data 820 as created by the preceding process shown in FIG. 5.

Figure 7:
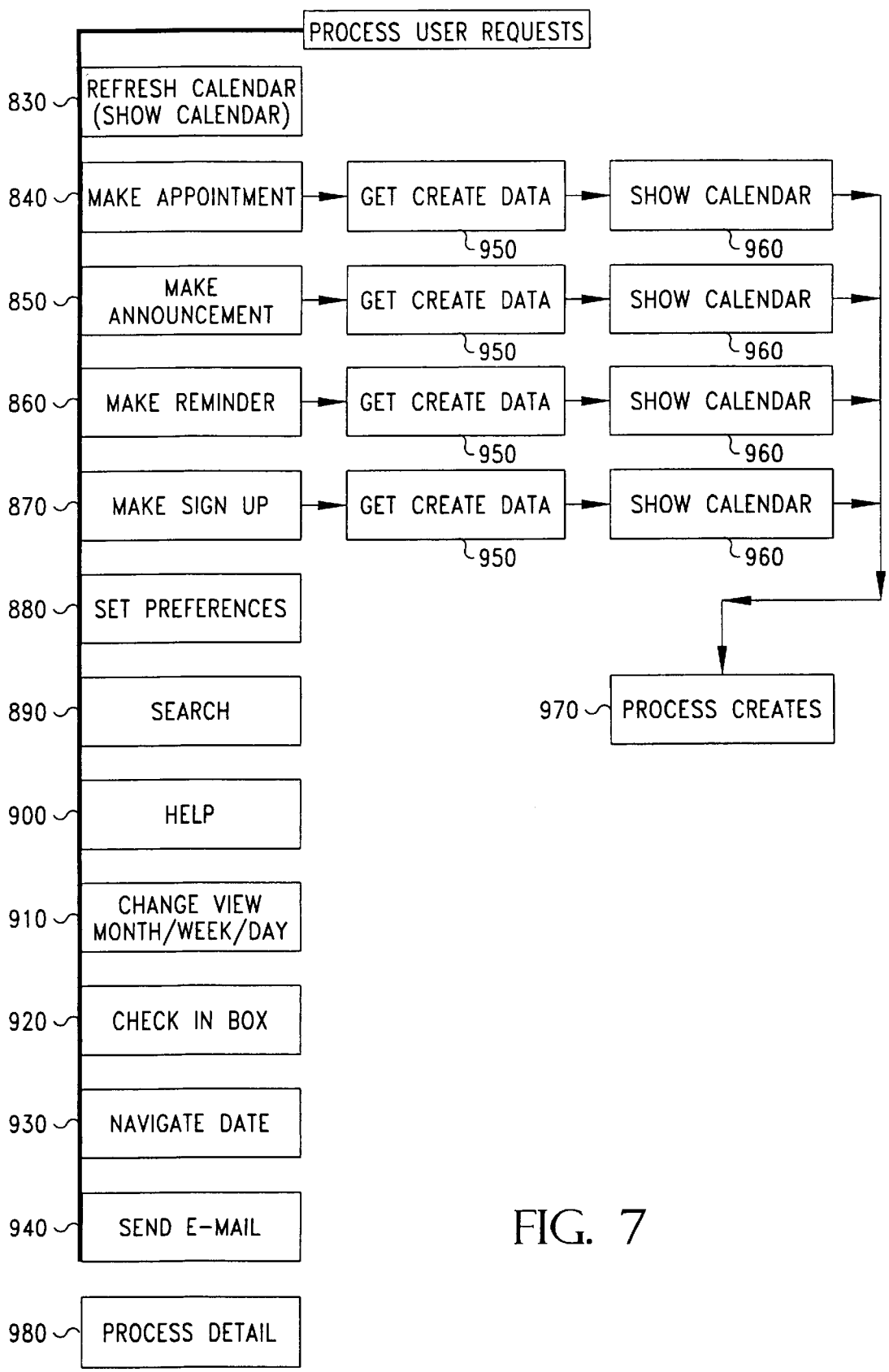
FIG. 7 is a flow diagram of a routine in the Appointnet system which processes user requests to the system.

FIG. 7 illustrates how the system processes particular end user requests. The subroutine of FIG. 7 is intended to be a non-limiting illustration of types of end user requests that can be handled by a preferred embodiment of the Appointnet system. This figure shows refreshing the calendar, or show calendar in one view (day/week/month) 830; Make an appointment 840, Announcement 850, as well as a Reminder 860. The end user may also create a sign-up sheet 870, and set preferences for his calendar 880. The end user can search the system for information 890, request on-line help if any assistance is desired 990, and set the calendar type be to a month, week, or day view 910. The end user can request a list of in-bound invitations and announcements 920, navigate dates 930, or send Email 940 for example. Certain of the actions shown in FIG. 7 cause the Appointnet system to create new data 950, which in turn causes the calendar to be redrawn 960. The system processes data pertaining to appointment creation 970, and further processes data returned from the detail displays 980.

Figure 8:
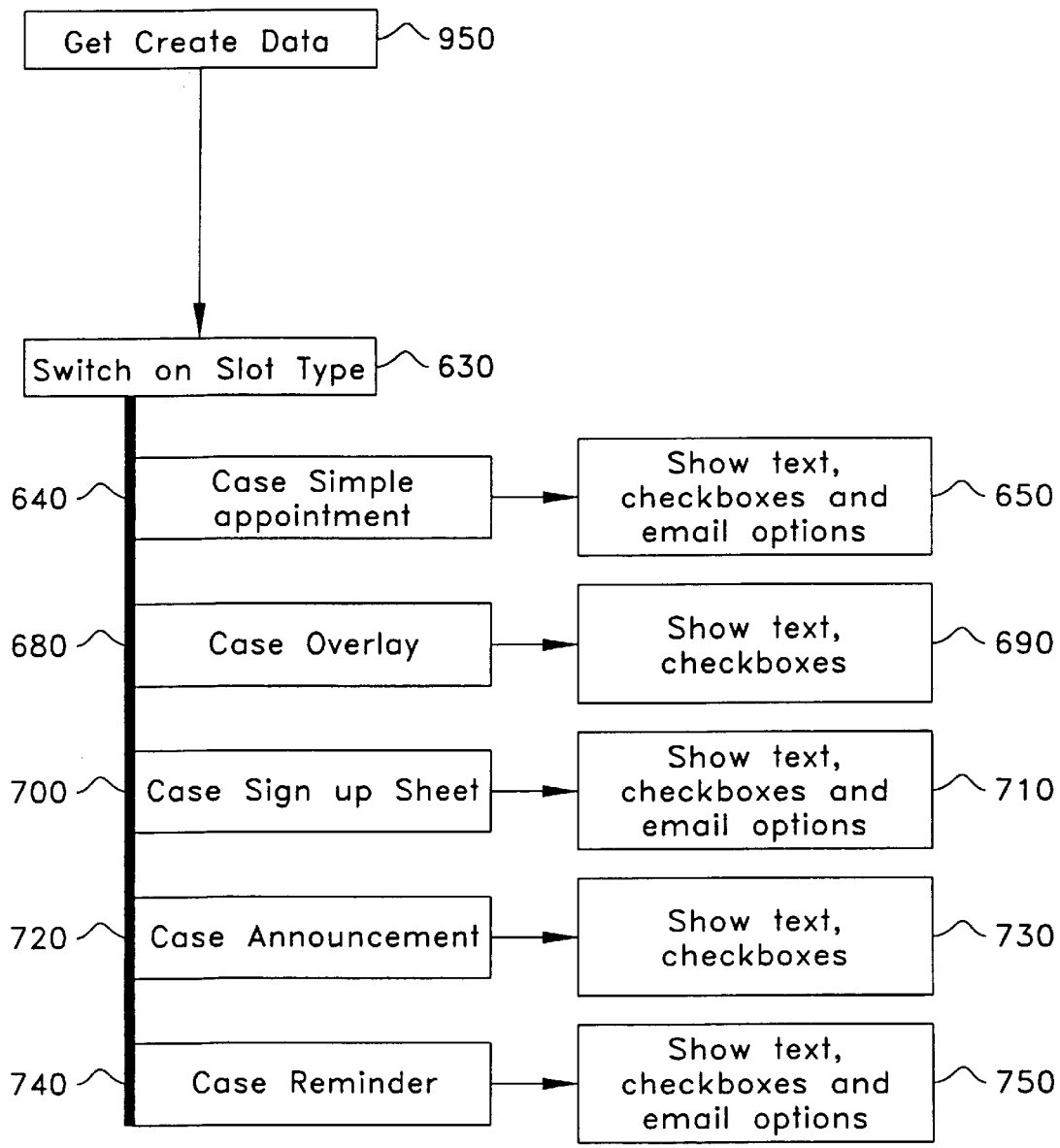
FIG. 8 is a flow diagram of a routine in the Appointnet system which displays screens for the creation of appointments of various types. (Detail of FIG. 7)

The process "get create data" 950 is similar in many respects to "get detail data" 560 shown in FIG. 5. Referring to FIG. 8, the system chooses only one path, using "Slot-Type" 630 to determine the path. Similar actions as those described in FIG. 5 may then be taken as illustrated in FIG. 8.

Figure 9:
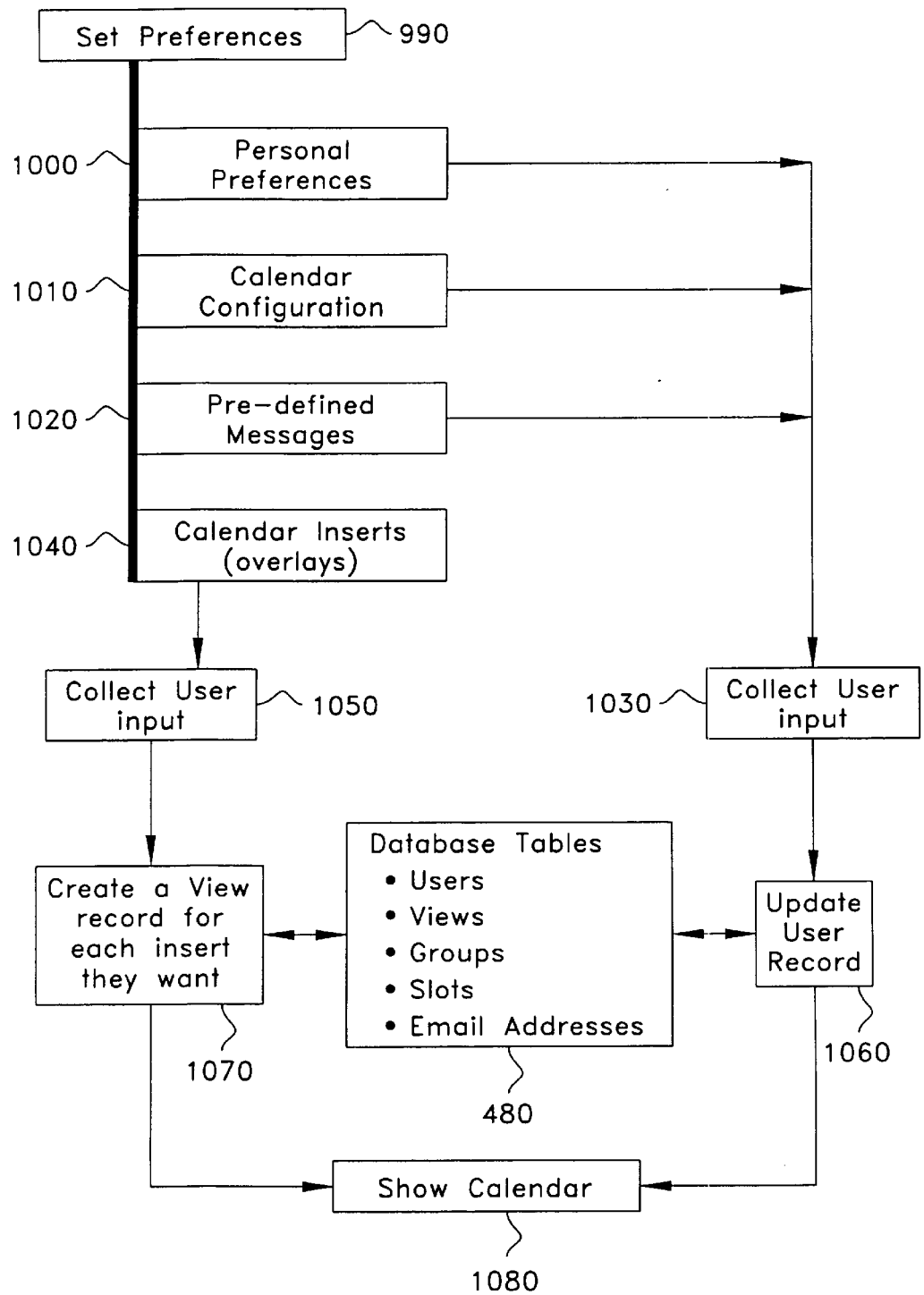
FIG. 9 is a flow diagram of a routine in the Appointnet system which sets the preferences for a particular calendar configuration. (Detail of FIG. 7, #880)
Figure 10A:
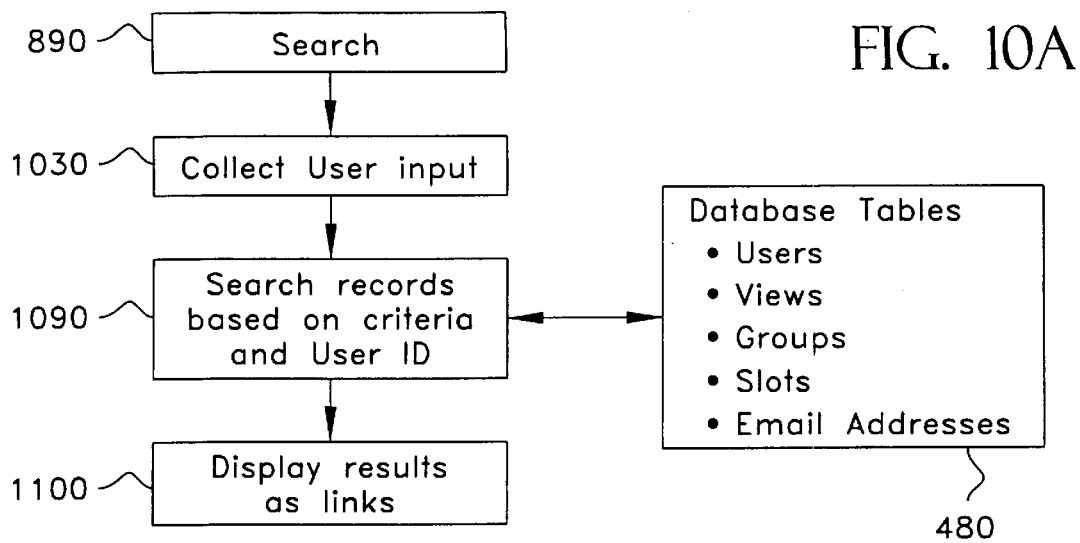
FIG. 10A is a flow diagram of a routine in the Appointnet system which searches for data and displays the data results as links.
Figure 10B:
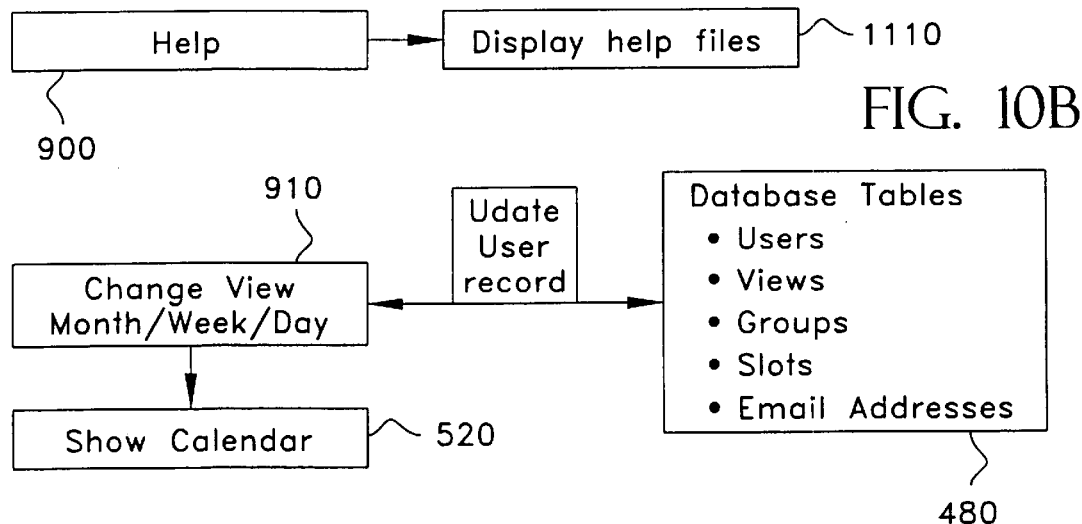
FIG. 10B is a flow diagram of a routine in the Appointnet system which allows the user to view a calendar by month, week or day.
Figure 10C:
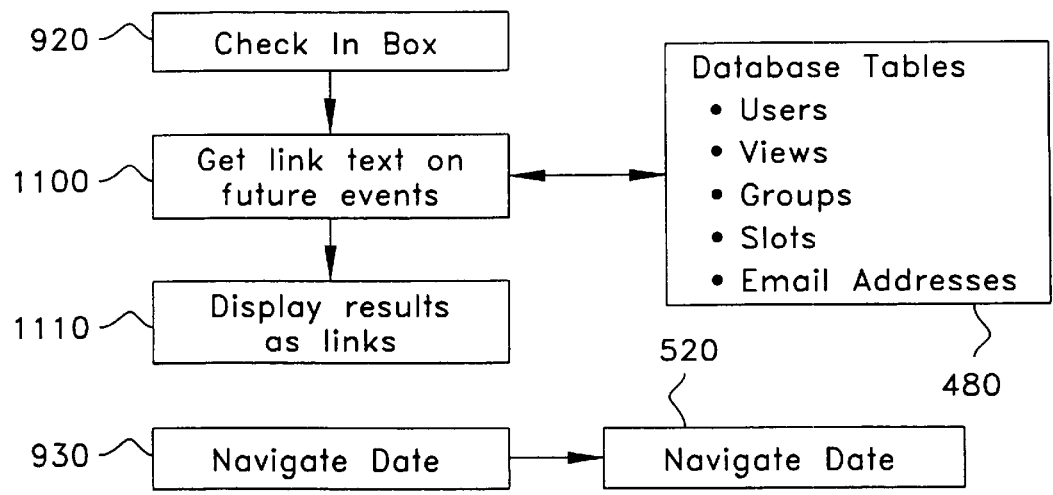
FIG. 10C is a flow diagram of a routine in the Appointnet system which displays incoming appointments as links.
Figure 11:
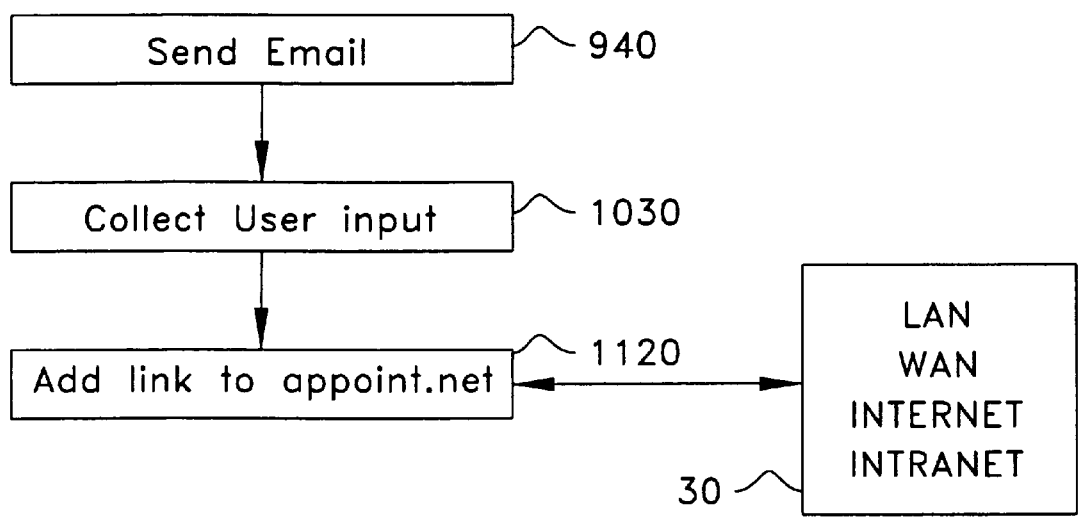
FIG. 11 is a flow diagram of a routine in the Appointnet system which sends EMail, and thereby pushes a calendar through the Internet to users.

The Appointnet system is versatile and allows end users to configure their calendars in virtually any desired fashion. End users change the configuration of a calendar by choosing the Set Preferences selection from the main calendar screen. The setting of preferences is illustrated in FIG. 9 at 900. The subroutine takes personal preferences 1000, calendar configuration 1010, and predefined messages 1020, then collects them at 1030. The users record is updated 1060 in conjunction with the Database Tables 480. The end user may want to add a calendar insert to his personal calendar. A calendar insert, or overlay is a schedule for a group, either large or small, that can be chosen at 1040 to be inserted into an individual's calendar. This way an end user can see the schedule for his group displayed in his own personal Appointnet calendar. Available overlays can be chosen by any number of end users. These choices are collected by the system 1050, and a View record 1070 is created for each calendar insert chosen by the end user. At the end of this subroutine the Appointnet system returns to the end user's calendar 1080.

FIGS. 10A through 10D and 11, illustrate some simple subroutines used by the Appointnet system to process the end user's requests as processed through their client devices and briefly detailed in accordance with FIG. 7. For example, to perform a search 890 the end user's input is collected in the client device and sent to the Appointnet system, where it is collected at 1030 and a search of the records based on the search criteria and the UserID is conducted at 1090. This search is based on the content of the Database Tables 480 and the results are displayed as links 1100. Similarly if Help is requested at 900 the contents of the Help files are displayed 1110.

To change the view of the calendar 910 to a month/week/day view, the end user selects the view, the client device sends the data about that selection to the Appointnet system, which in turn updates the user record 1120 using the Database tables 480, and then the new calendar is formatted by the Appointnet system, complete with all appropriate text, links and icons. That formatted HTML information is sent to the client device for display to the end user 520. The end user can see what messages were sent to him by checking the InBox 920. When this happens at 920, the Database Tables 480 are searched for messages, and the results of that search are displayed as a list of links to the information 1110. An end user may wish to view a day that is not currently displayed on his calendar. He can see any date for years into the future. This is called navigating the date. To navigate a date 930, the date is chosen and the new calendar is shown 520. To send Email (FIG. 11) at 940 the input from the client device is collected by the Appointnet system 1030, the link to the Appointnet system 1120 is added to the Email, and the Email is sent through the transport medium 30.

Figure 12:
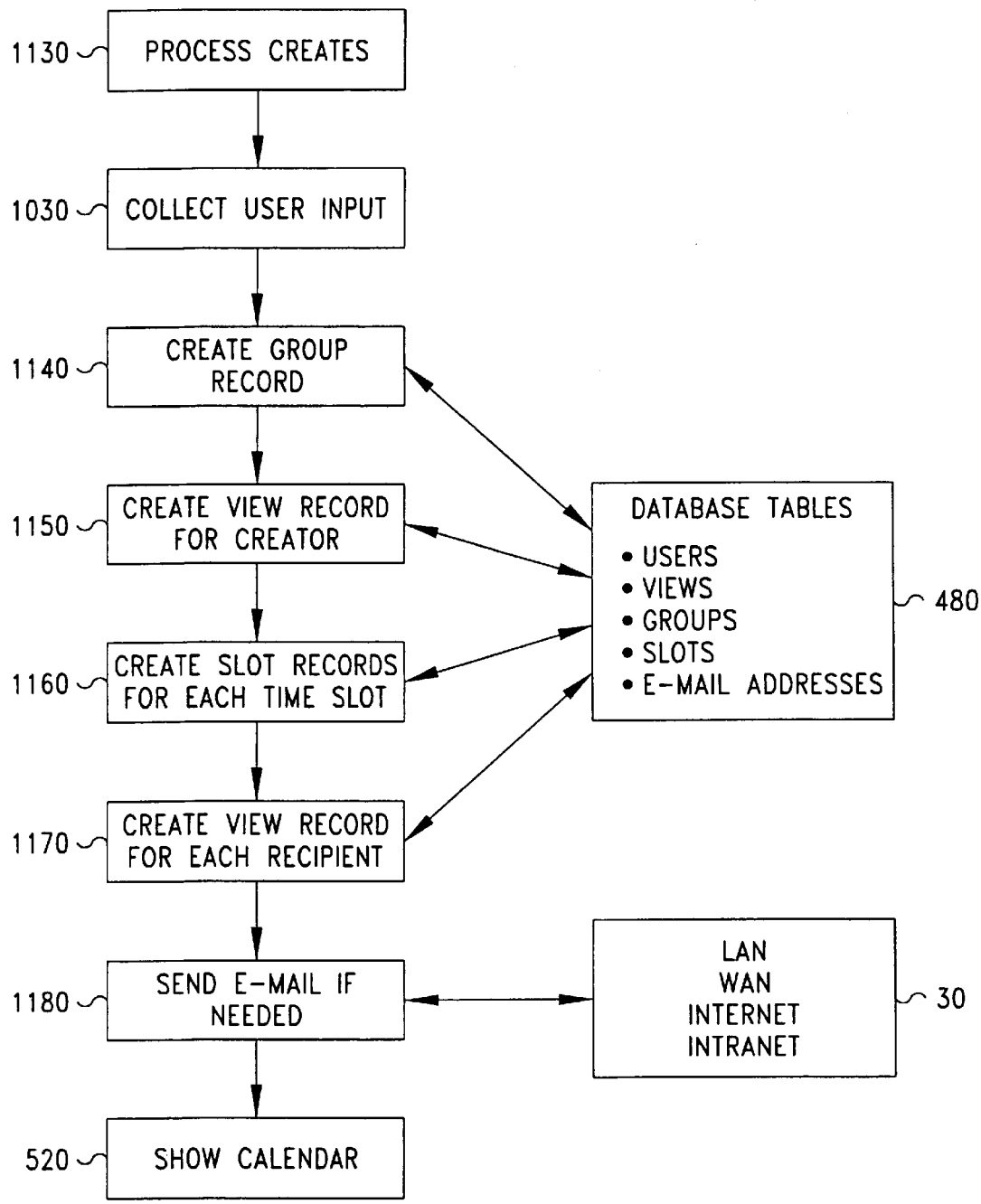
FIG. 12 is a flow diagram of a routine in the Appointnet system which creates an appointment. (Detail of FIG. 7, #970)

The process of creating an appointment, an announcement, a reminder, an invitation or any other type of time sensitive message 1130 is illustrated by FIG. 12. An end user makes entries at his client device 20. That information comes to the Appointnet system through the transport medium 30, where it is collected 1030. It is then determined by the system that the end user is sending an invitation. A "Group" record is created 1140 in accordance with the Database Tables 480. Then a "View" record is created 1150 for the end user who is creating the invitation. This is also done in accordance with the Database Tables 480. "Slot" records 1160 are made for each time slot requested by the creating end user. This is also done in accordance with the Database Tables 480. Next, "View" records are made so each of the recipients of the invitation will be able to see it at 1170. If it is desired that Email be sent to the recipient(s), then the Appointnet system formats the text and sends the Email to the transport medium 30. Next the end user's calendar is shown at 520.

Figure 13:
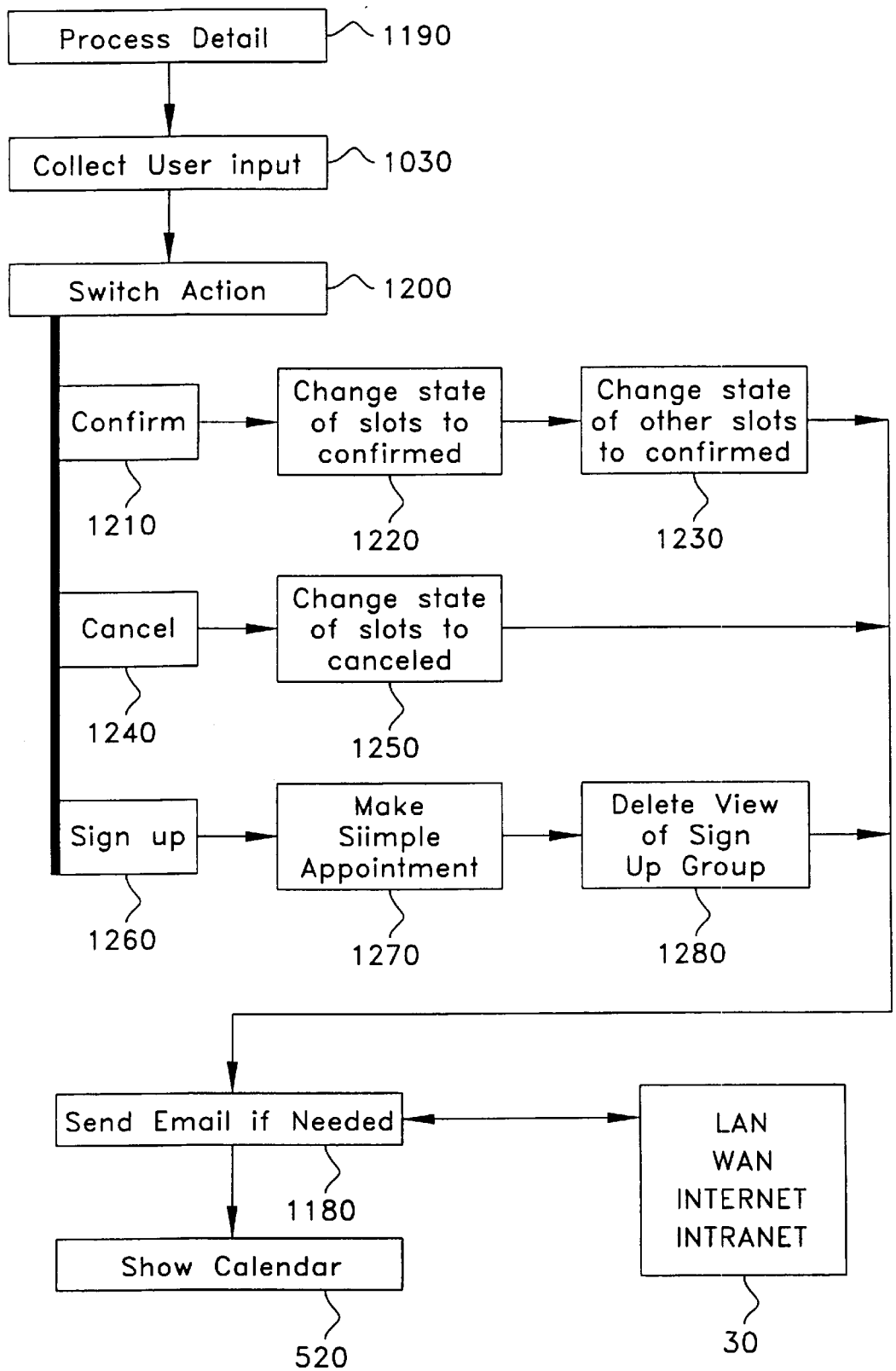
FIG. 13 is a flow diagram of a routine in the processes using input from a detail in FIG. 5.

FIG. 13 illustrates the subroutine for processing detail information at 1190. First, show a detail page then collect end user input 1030 which is delivered to Appointnet from the client device 20. Based on that input, it is next desired to switch to the particular action that is desired by the end user 1200. For example, an end user may choose to confirm an appointment 1210. When this is the case, the information in the SlotState field is changed 1220 to confirmed in the accepted time slot, and to canceled in the other slots 1230. This results in the time slot being confirmed in both calendars. An end user may want to cancel the invitation 1240, and this results in all the SlotStates being changed to canceled 1250. In the event a sign-up 1260 is requested, a simple appointment can be made 1270 after which the "View" of this is deleted for the sign-up group 1280. Once any or all of the above actions are taken, Email may be sent 1180 through the transport medium 30 and the calendar can be shown.

Figure 14:
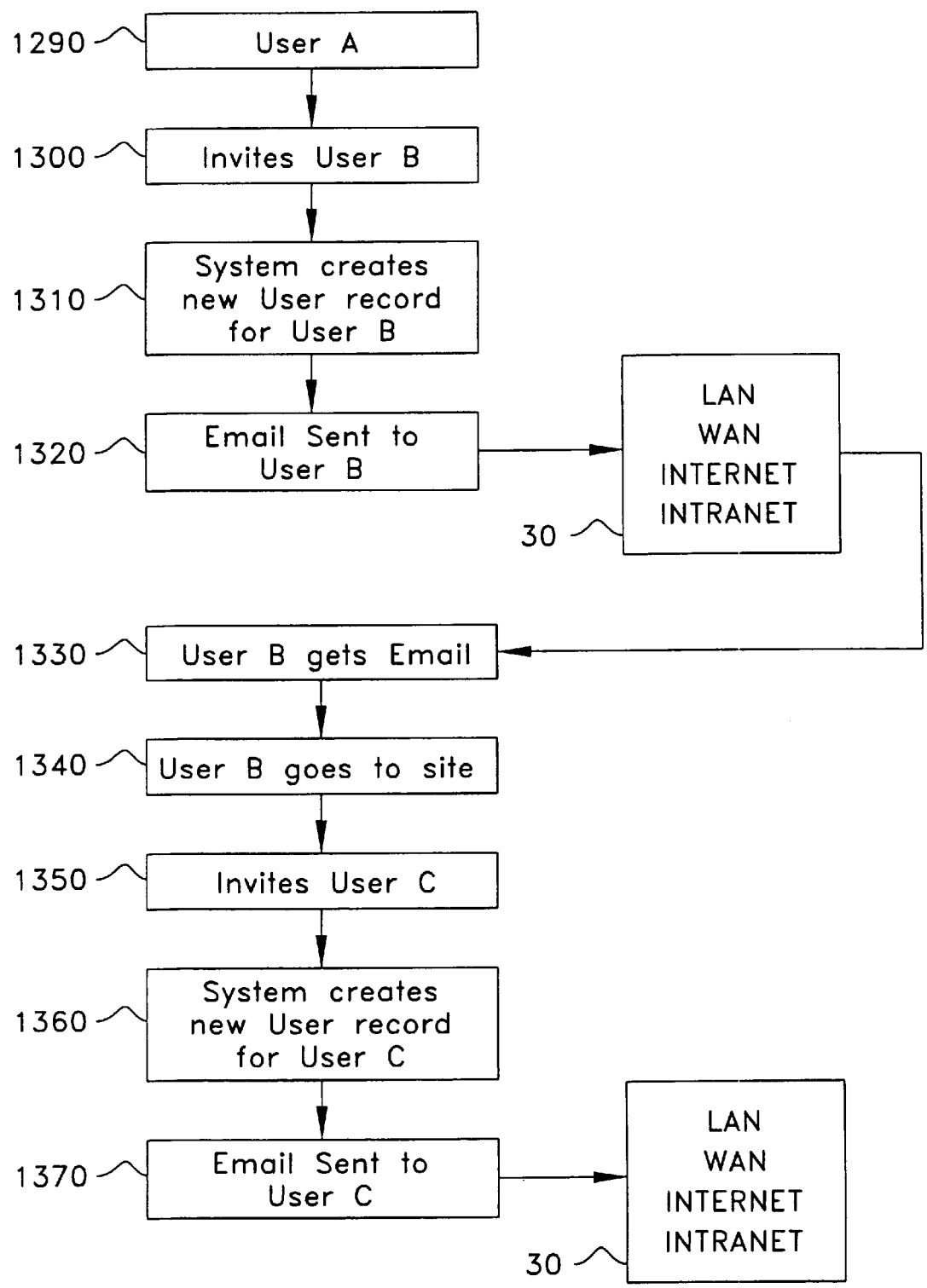
FIG. 14 is a flow diagram of a routine of how the Appointnet system of the present invention spreads throughout users of the system through a backbone.

One of the more intriguing and useful aspects of the Appointnet system is that the system has a self-replicating aspect, in that it creates new calendars for people who are not yet active members when these non-users are contacted by current end-users through the Appointnet Email component. This Email is sent to these not-yet-active users inviting them to come to the Appointnet site and become active users. This process is illustrated in FIG. 14 which shows that when a new end user joins at the Appointnet Web site they get a private personal calendar showing a waiting invitation. The new end user can then in turn send invitations to other potential end users and also bring them in to the Appointnet system. This process can be repeated over and over.

Thus, end user A 1290 invites end user B 1300 to make an appointment and the Appointnet System automatically creates a new client record for end user B 1310. Email is then sent to end user B at 1320 through the transport medium 30. When end user B gets the Email 1330 end user B goes to the Appointnet Web site 1340 and once in, can invite new end user C 1350 to an appointment. The system similarly creates a new record for the new end user C 1360, sends the Email to new end user C 1370 through the transport medium 30, and this sequence is then repeated. In this manner the Appointnet system spreads and becomes ubiquitous throughout the Internet. This results in individuals having easy access to the creation and confirmation of appointments, reminders, invitations and all other time sensitive messages with other end users around the world.

Figure 16A:
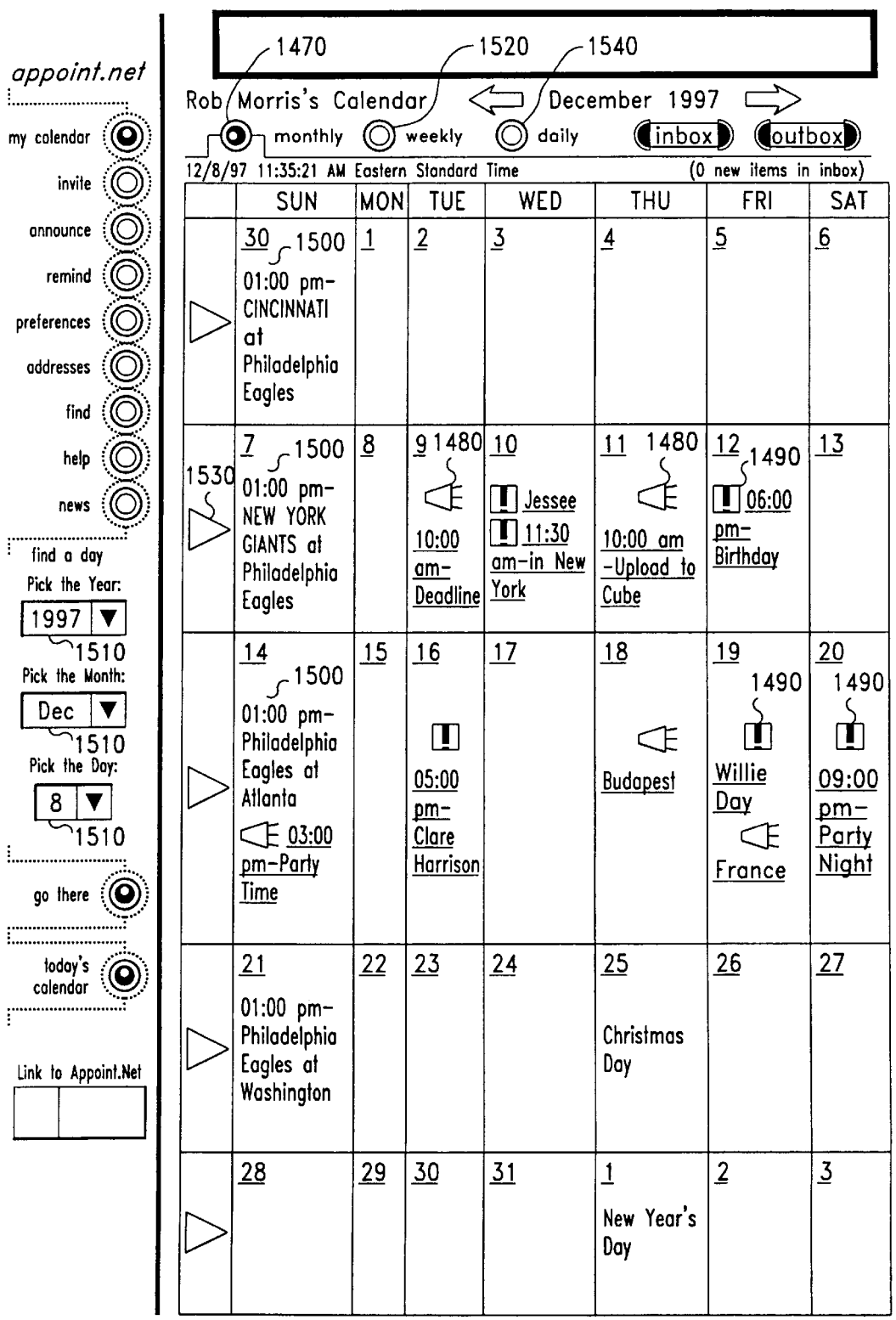
Figure 17A:
Figure 17E:

FIGS. 16A, 16B, and 16C illustrate a typical calendar generated by the Appointnet system of FIG. 15, and by the routines discussed above. FIG. 16A is the monthly version 1470 of a typical calendar. Several Announcements, are shown for example at 1480. These Announcements appear at various dates. Reminders are also shown at 1490 at various different dates. In accordance with the present invention, it is possible for the end user to choose to overlay another schedule on to the end user's calendar. Thus a football schedule 1500 is overlaid on the calendar of FIG. 16A showing the various football games which will be played in the month. The overlay items, as well as other calendar items, have hypertext links to detail information and/or are other uniform resource locators ("URLs") Several pull-down boxes 1510 allow an end user to navigate a date by selecting the month, date and year of interest.

FIG. 16B is the weekly calendar chosen for example as a particular week in the month of FIG. 16A. It is only required to select the weekly button 1520 or click on the arrow of the week 1530 for that selected week to be displayed along with associated events, announcements, reminders, and the like as shown in FIG. 16B. An end user can select a daily view as shown in FIG. 16C by clicking on the underlined date text found in the day cell. The daily view is displayed along with associated events, announcements, reminders, and the like.

FIG. 17A through 17F illustrate the sending of an invitation to an end user from an existing end user using the Appointnet system of FIG. 15. The "Invite" function is used to request an appointment with someone 1550. The calendar's mode (monthly/weekly/daily) is determined by the current state of the calendar in view. In the monthly mode of this embodiment, the inviting user can choose up to 10 time slots for any time sensitive event with the pull-down time lists 1555 found in each day's cell. (While inviting 10 times is currently available with the system, any number of time slots for time sensitive events is possible.) Otherwise the user can use the pull-down menu 1560 to suggest up to 10 times and dates that are free for the meeting, and do not appear on the displayed calendar. The invitee's Email address is filled in 1570 or can be selected from a list of addressed that were saved earlier 1580. The subject 1590 for the invitation may be filled in as well as the length of time for the particular invitation 1600. Upon sending the invitation 1610, a view record is created both for the invitee and invitor. Email may also be sent to the invitee at this time. The Email alerts the invitee about the invitation and lures the user to the site where the user can see and gain access to their calendar.

In the weekly mode 1520 (FIG. 17C) it is also possible to choose up to 10 times for the proposed meeting from the visible calendar by selecting the check boxes in the hourly grid 1625, or to use the drop down boxes 1630. Similar to the operation of the monthly calendar 1550 the weekly calendar 1620 the Email address, subject and a message 1640 can be sent with the invitation. When the daily mode is chosen 1540 similar functions are available, and similar steps are taken to those steps taken in the monthly and weekly modes.

Figure 18A:
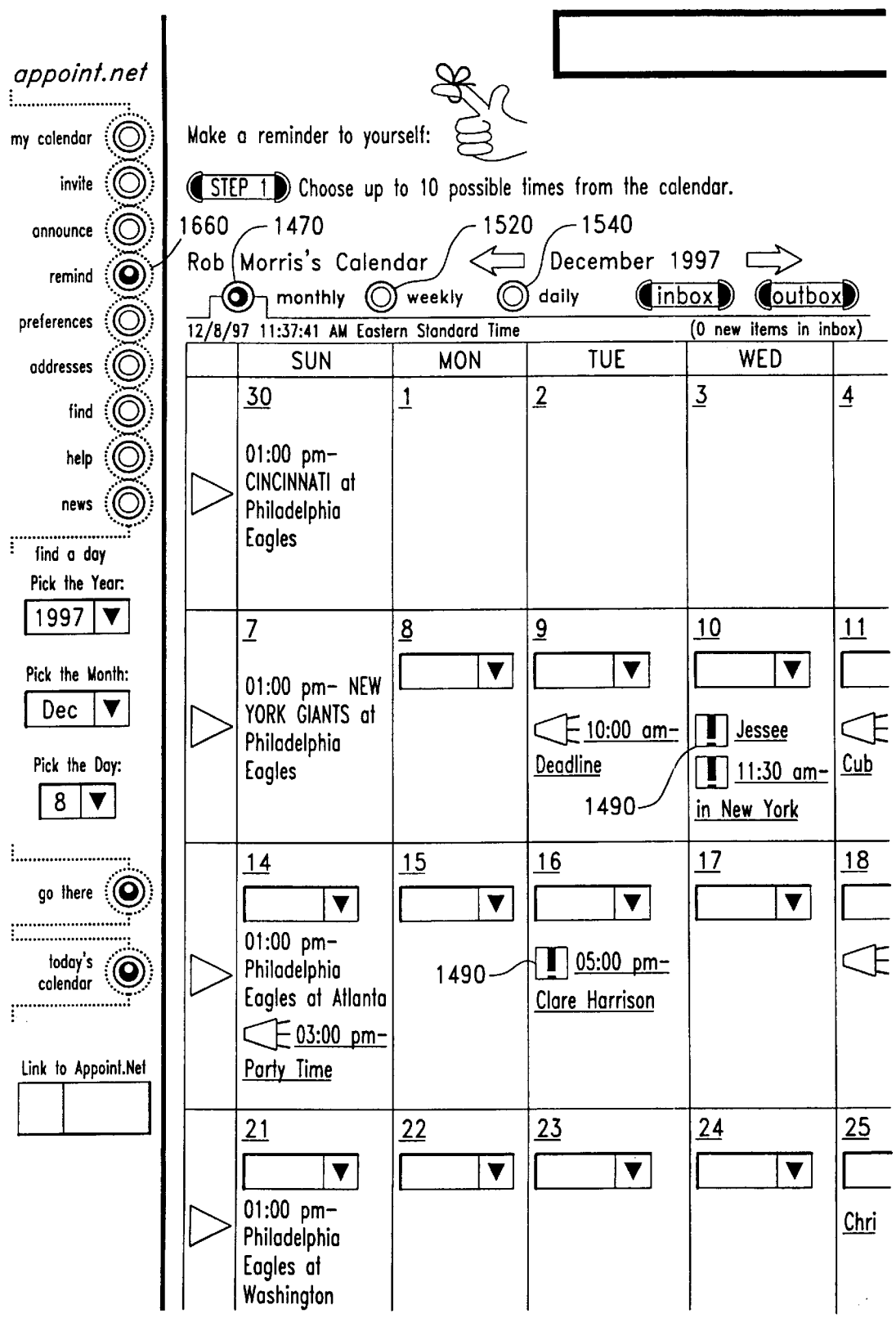

FIGS. 18A and 18B illustrate the creation of a reminder that is to appear in one's own calendar within the Appointnet system. An end user selects the "Reminder" button on the left menu bar to start the process. In this process a subject 1590 is entered, a length of time 1600 is entered, and the reminder text can be entered as well at 1670. When the Send button 1610 is selected the reminder is posted to the client's own calendar.

Figure 19B:

FIGS. 19A through 19B illustrate how end users create an Announcement on the Appointnet system. In a process similar to sending invitations and making reminders, the end user selects the time(s) to place the announcement, enters the Email address of the recipient(s) 1570, the subject 1590, and Email text 1595 if any. Then the announcement is sent when the end user selects "Send".

FIG. 20 shows the "In Box" screen that the end user sees when he selects the "In Box" button from his calendar. This screen is presented in the client device 20, and the end user can select various kinds of messages to search. These search criteria can limit the search to a kind of message, or a period of time, for example.

FIGS. 21A through 21C illustrate the detail pages that are available to end users. The detail can be about Announcements for example as is shown in FIG. 21A. To get a detail page, an end user looking at his calendar would select an Announcement, for example. (Refer to FIG. 17C, and look at cell "Thu Dec, at 10:00 AM".) That end user would be presented with a detail similar to the one found in FIG. 21A. Any other message visible on a detail page that is presented as a hyperlinked text can be selected from the detail page. Doing so causes the Appointnet system to generate a detail page for that selection. It is also interesting to note here that Detail pages of the present invention are comprised of details about one message, and these details are inserted into a daily calendar. This is done to help the end user avoid scheduling conflicts. A "Contact Log" 1700 area is also preferably present in the detail page. The Contact Log area acts as a threaded record of all communications between the end users involved with this Announcement, Appointment, or Reminder, for example. It is possible to read the contents of this log and review the response messages sent back and forth about this scheduled event. Thus, Appointnet provides interactive detail for each event which has heretofore not been achievable with prior scheduling systems.

The Appointnet system provides through statistical and access recordation the feature of manual and automatic user profiling. This allows for real-time distribution of time sensitive data and information delivered to a user's calendar or other client device. The system also for real-time broadcasting of time sensitive information to multiple end users' calendars or client devices.

The Appointnet system described in accordance with the present invention is thus an efficient Web-based system that allows nearly an infinite number of clients to make and confirm appointments with each other. The system does not require that the end users have any special software in their client devices 20 other than the standard Web browsers that are already on the market. The system is simple to use, transparent to end users, and greatly facilitates appointment making which heretofore has not existed in the art.

There have thus been described certain preferred embodiments of scheduling systems provided in accordance with the present invention. While preferred embodiments have been described and disclosed, it will be recognized by those with skill in the art, that modifications are within the true spirit and scope of the invention. The appended claims are intended to cover all such modifications.

What is claimed is:

1. A computer system for scheduling events between a plurality of end users comprising:

a client interface for allowing an initial end user to communicate a desired scheduled event through the system to either other end users or other potential end users of the system;

a transport medium interface for allowing the system to transport the desired scheduled event between the other end users or other potential end users of the system;

a computer subsystem in communication with the client interface and transport medium for generating a calendar for the initial end user that is adapted to contain the desired scheduled event for the initial end user and which may be modified by either other end users of the system or the initial end user; and means for adjusting for different time zones between the end users of the system.

2. A computer system for scheduling events between a plurality of end users comprising:

an end user interface that is generated in a standard page markup syntax language which may be accessible by a first end user of the system using standard communication protocols and which allows the first end user to establish a desired event to be scheduled within the system;

a computer subsystem in communication with the end user interface for generating an active calendar grid for the first end user that is adapted to contain the scheduled event for the first end user in the time zone of the first end user and which may be modified by a preselected second end user of the system or the first end user;

a transport medium interface to transport the desired scheduled event to the preselected second end user of the system using the standard communication protocols and for providing a medium by which the preselected second end user can confirm the scheduled event on the active scheduling grid of the first end user;

said computer subsystem further generating a second active calendar grid for the preselected second end users in which the scheduled event is scheduled according to the time zone of the second end user via an end user interface that is generated in a standard page markup syntax language and which may be accessible by the second end user of the system using standard communication protocols.

3. A computer system for scheduling events between a plurality of end users comprising:

an end user interface that is generated in a standard page markup syntax language which may be accessible by a first end user of the system using standard communication protocols and which allows the first end user to establish a desired event to be scheduled within the system;

a computer subsystem in communication with the end user interface for generating an active calendar grid for the first end user that is adapted to contain the scheduled event for the first end user in the time zone of the first end user and which may be modified by a preselected potential second end user of the system or the first end user;

a transport medium interface to transport notification of the desired scheduled event to the preselected potential second end user of the system via an electronic mail message using the standard communication protocols, said electronic mail message providing a hyperlink to said computer subsystem by which the preselected second end user can obtain and confirm the scheduled event on the active scheduling grid of the first end user and further authorize the creation of an active scheduling grid for said second end user.

\* \* \* \* \*